United States Patent
Amin et al.

(10) Patent No.: US 10,037,320 B2
(45) Date of Patent: Jul. 31, 2018

(54) CONTEXT-AWARE APPROACH TO DETECTION OF SHORT IRRELEVANT TEXTS

(71) Applicant: Microsoft Technology Licensing, LLC, Redmond, WA (US)

(72) Inventors: Mohammad Shafkat Amin, Cupertino, CA (US); Baoshi Yan, Belmont, CA (US); Anmol Bhasin, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/587,650

(22) Filed: Dec. 31, 2014

(65) Prior Publication Data
US 2015/0378986 A1    Dec. 31, 2015

Related U.S. Application Data

(60) Provisional application No. 62/019,274, filed on Jun. 30, 2014.

(51) Int. Cl.
G06F 17/24 (2006.01)
G06F 17/27 (2006.01)
(Continued)

(52) U.S. Cl.
CPC .......... G06F 17/2785 (2013.01); G06F 17/24 (2013.01); G06F 17/2775 (2013.01);
(Continued)

(58) Field of Classification Search
None
See application file for complete search history.

(56) References Cited

U.S. PATENT DOCUMENTS

2009/0287642 A1*  11/2009  Poteet .................... G06Q 30/02
2010/0223226 A1    9/2010  Alba et al.

FOREIGN PATENT DOCUMENTS

CN   102254038 A   11/2011
CN   103226576 A    7/2013
(Continued)

OTHER PUBLICATIONS

Jacob Soman Saini, A Study of Spam Detection Algorithm on Social Media Networks, Dec. 2013, pp. 195-202 URL: http://link.springer.com/chapter/10.1007%2F978-81-322-1680-3_22.*
(Continued)

Primary Examiner — Richa Mishra
(74) Attorney, Agent, or Firm — Schwegman Lundberg & Woessner, P.A.

(57) ABSTRACT

Systems and methods are disclosed for determining whether a short amount of text is irrelevant. Initially, an article is selected having one or more comments of varying length. Depending on the number of comments available, a native context may be constructed based on a given comment and other neighboring comments. In other embodiments, a transferred context may be constructed from the given comment and topically similar comments extracted from other, topically similar articles. A native context-aware feature may be determined from the constructed native context and a transferred context-aware feature may be determined from the constructed transferred context. These features may be leveraged by a language classifier to determine whether a given comment is irrelevant.

17 Claims, 18 Drawing Sheets

(51) Int. Cl.
G06F 17/28 (2006.01)
G06F 17/30 (2006.01)
H04L 12/58 (2006.01)

(52) U.S. Cl.
CPC ........ G06F 17/28 (2013.01); G06F 17/30707 (2013.01); H04L 51/12 (2013.01)

(56) References Cited

FOREIGN PATENT DOCUMENTS

| CN | 103455581 A | 12/2013 |
| CN | 103455581 A1 | 12/2013 |
| CN | 105279146 A | 1/2016 |
| WO | WO-2013112061 A1 | 8/2013 |
| WO | WO-2016003508 A1 | 1/2016 |

OTHER PUBLICATIONS

Jenq-Haur Wang, Using Inter-Comment Similarity for Comment Spam Detection in Chinese Blogs, 2011, pp. 189-194 URL: http://ieeexplore.ieee.org/xpls/abs_all.jsp?arnumber=5992602&tag=1.*
"International Application Serial No. PCT/US2015/023075, International Search Report dated Jul. 14, 2015", 3 pgs.
"International Application Serial No. PCT/US2015/023075, Written Opinion dated Jul. 14, 2015", 7 pgs.
Anderson, T. W., "An Introduction to Multivariate Statistical Analysis", Wiley, 3rd Edition, (2003), 739 pgs submittedinparts 0004_anderson_multivariatestatisticalanalysisPart1-Part6.
Bhattarai, A., et al., "Characterizing Comment Spam in the Blogosphere through Content Analysis", (2009), 1-8.
Blei, David M., et al., "Latent Dirichlet Allocation", Journal of Machine Learning Research 3 (2003) 993-1022, (2003), 993-1022.
Chang, Yi, et al., "Towards Twitter Context Summarization with User Influence Models", WSDM, (2013), 1-10.
Deerwester, Scott, et al., "Improving Information Retrieval With Latent Semantic Indexing", ASIS '88—Proceedings of the 51st ASIS Annual Meeting, vol. 25, (1988), 36-40.
Golub, G. H., "Matrix Computations", John Hopkins University Press, 3rd edition, (1996), 1-1723.
Hu, Xia, et al., "Exploiting Internal and External Semantics for the Clustering of Short Texts Using World Knowledge", CIKM, (2009), 1-10.
Jiin, Ou, et al., "Transferring Topical Knowledge from Auxiliary Long Texts for Short Text Clustering", CIKM, (2011), 1-10.
Jindal, Nitin, et al., "Opinion Spam and Analysis", WSDM, (2008), 1-11.
Kant, Ravi, et al., "Comment Spam Detection by Sequence Mining", WSDM, (2012), 183-192.
Kantchelian, Alex, et al., "Robust Detection of Comment Spam Using Entropy Rate", AISec'12, (2012), 1-11.
Lim, Ee-Peng, et al., "Detecting Product Review Spammers using Rating Behaviors", CIKM'10, (2010), 1-10.
Long, Guodong, et al., "TCSST: Transfer Classification of Short & Sparse Text Using External Data", CIKM'12, (2012), 764-772.
Mishne, Gilad, "Blocking Blog Spam with Language Model Disagreement", AIRWeb'05, (2005), 1-6.
Mishne, Gilad, et al., "Leave a Reply: An Analysis of Weblog Comments", WWW2006, (2006), 1-8.
Mukherjee, Arjun, et al., "Spotting Fake Reviewer Groups in Consumer Reviews", WWW 2012, (2012), 1-10.
Pan, Sinno Jialin, et al., "A Survey on Transfer Learning", IEEE Transactions on Knowledge and Data Engineering, vol. 22, No. 10, (Oct. 2010), 1345-1359.
Phan, Xuan-Hieu, et al., "Learning to Classify Short and Sparse Text & Web with Hidden Topics from Large-scale Data Collections", WWW 2008, (Apr. 2008), 91-100.
Sahami, Mehran, et al., "A Web-based Kernel Function for Measuring the Similarity of Short Text Snippets", WWW 2006, (2006), 1-10.
Serbanoiu, Andrei, et al., "Relevance-Based Ranking of Video Comments on YouTube", Control Systems and Computer Science, (May 29, 2013), 225-231.
Song, Ge, et al., "Short Text Classification: A Survey", Journal of Multimedia vol. 9, No. 5, (May 2014).
Wang, Jenq-Haur, et al., "Using Inter-Comment Similarity for Comment Spam Detection in Chinese Blogs", Advances in Social Networks Analysis and Mining (ASONAM), (Jul. 25, 2011), 189-194.
Wang, Jing, et al., "Diversionary Comments under Political Blog Posts", CIKM, (2012), 1789-1793.
Xu, Jinxi, et al., "Query Expansion Using Local and Global Document Analysis", SIGIR '96, (1996), 4-11.
Xu, Wei, et al., "Document Clustering Based on Non-negative Matrix Factorization", SIGIR'03, (2003), 267-273.
Yan, Xiaohui, et al., "A Biterm Topic Model for Short Texts", WWW 2013, (2013), 1445-1455.
Yan, Xiaohui, et al., "Learning Topics in Short Texts by Non-negative Matrix Factorization on Term Correlation Matrix", SIAM, (2013), 749-757.
Yih, Wen-Tau, et al., "Improving Similarity Measures for Short Segments of Text", AAAI, (2007), 1-6.
Zhong, Erheng, et al., "Contextual Collaborative Filtering via Hierarchical Matrix Factorization", SIAM, (2012), 744-755.
"European Application Serial No. 15160175.4, Extended European Search Report dated Nov. 26, 2015", 11 pgs.
Jenq-Haur, Wang, et al., "Using Inter-comnent Similarity for Comment Spam Detection in Chinese Blogs", Advances in Social Networks Analysis and Mining (ASONAM), 2011 International Conference on, IEEE, (Jul. 25, 2011), 189-194.
"International Application Serial No. PCT/US2015/023075, International Preliminary Report on Patentability dated Jan. 12, 2017", 8 pgs.
"Chinese Application Serial No. 201510187455.3, Office Action dated Aug. 1, 2017", with English translation of claims, 12 pgs.
"European Application Serial No. 15160175.4, Response filed Jun. 22, 2016 to Communication dated Jan. 11, 2016", 16 pgs.
Diao, Yufeng, "LDA-Based Opinion Spam Discovering", Journal of Chinese Information Processing, vol. 25, No. 1 (in Chinese, with English abstract), (Jan. 31, 2011), 41-47.
Jenq-Haur, Wang, et al., "Using Inter-Comment Similarity for Comment Spam Detection in Chinese Blogs", The Proceeding of IEEE 2011 International Conference on Advances in Social Networks Analysis and Mining, (Jul. 25, 2011), 189-194.

* cited by examiner

CONTEXT-AWARE APPROACH TO DETECTION OF SHORT IRRELEVANT TEXTS

CROSS-REFERENCE TO RELATED APPLICATIONS

This application claims the benefit of priority to U.S. Pat. App. No. 62/019,274, filed Jun. 30, 2014 and titled "CONTEXT-AWARE APPROACH TO DETECTION OF SHORT IRRELEVANT TEXTS," the disclosure of which is hereby incorporated by reference herein in its entirety.

TECHNICAL FIELD

The subject matter disclosed herein generally relates to a system and method for determining and removing irrelevant texts, and, in particular, to determining whether a short text is irrelevant based on a surrounding plurality of texts or, in the absence of a sufficient number of texts, a transferred context determined from similar texts.

BACKGROUND

Popular online content providers attract millions of visitors per day. The content providers may provide one or more webpages having content readable by the various visitors. The one or more webpages may be configured to allow the visitors to provide feedback (e.g., comments) for the subject of the one or more webpages. For example, a webpage may be a news article and the online content provider may allow visitors to provide comments about the article.

However, to facilitate discussion among visitors, online content providers may not screen (e.g., moderate) comments left by the visitors. In doing so, malicious visitors (e.g., spammers or other irresponsible visitors) may leave comments that are irrelevant to the topic of the given webpage. These comments may include offers to work from home, product promotions, event promotions, advertising, marketing materials, and other such comments. These types of comments are problematic because they detract from the open forum promoted by the online content provider and drives legitimate visitors (e.g., visitors that leave comments relating to the topic of the webpage) away. This, in turn, reduces the overall visitor traffic to the online content provider. As online content providers typically rely on visitor traffic to generate revenue, a decrease in legitimate visitors impacts the online content provider to generate such revenue.

BRIEF DESCRIPTION OF THE DRAWINGS

Some embodiments are illustrated by way of example and not limitation in the figures of the accompanying drawings.

DETAILED DESCRIPTION

Detecting irrelevant comments to an article or posting is difficult. First, comments are usually very short, and given such limited information, it is difficult to capture the semantics and relevance of the comments.

Second, under different contexts, the same word can have quite different meanings. For example, given two news articles on real estate and NASA's mars exploration plan, respectively, the term "space" used in the comments of these articles can refer either to "an area rented or sold as business premises" or "the physical universe beyond the earth's atmosphere", which are two completely different concepts. Notably, the context of the comment has an important role in defining the semantics and relevance of the comment.

Figure 1A:
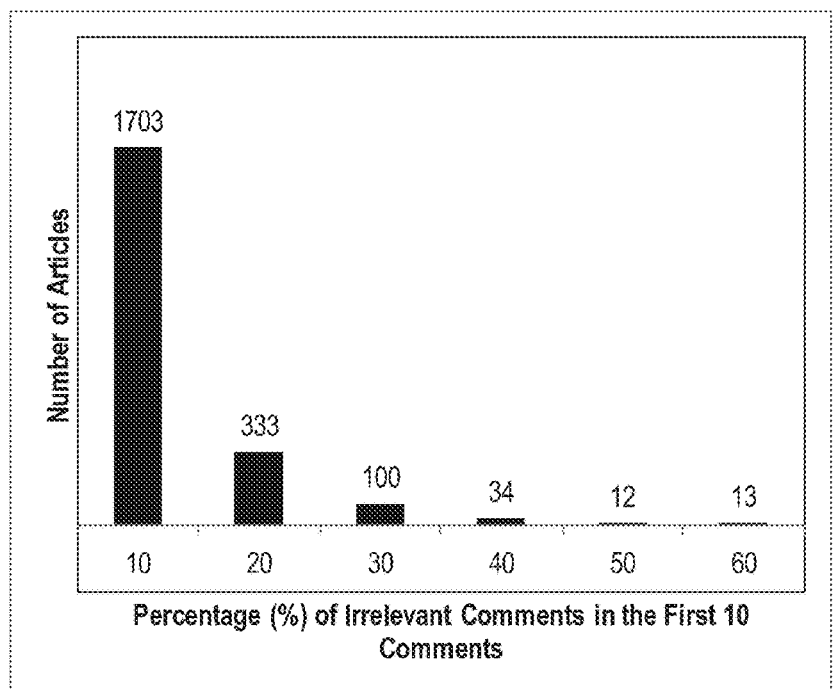
FIGS. 1A-1B are graphs illustrating the percentage of irrelevant comments in a set of comments for a given article posted by an online content provider.
Figure 1B:
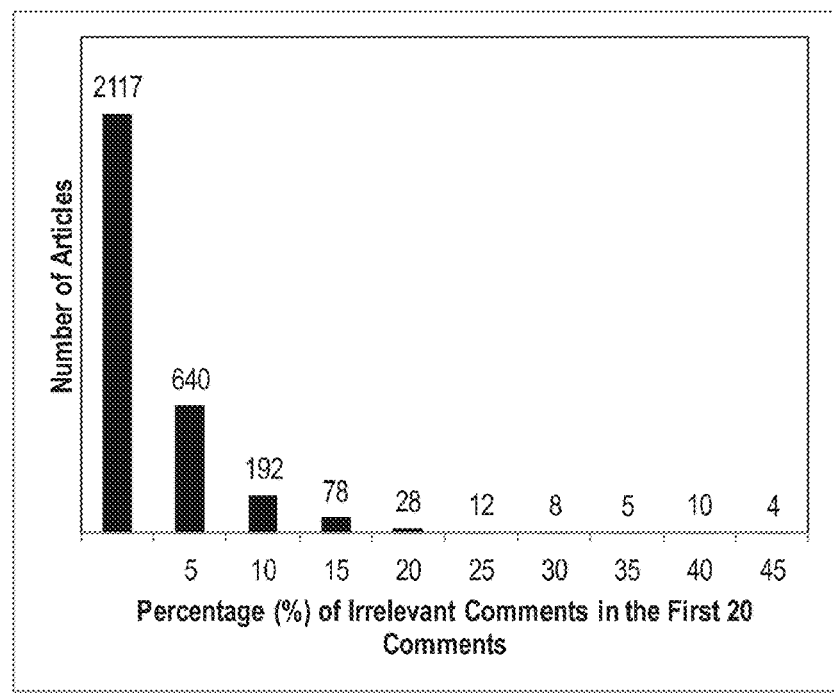

Third, in real world applications, there are situations where irrelevant comments are posted soon after the release of an article, with only a small number of comments. For illustration, FIGS. 1A and 1B are graphs illustrating the percentage of irrelevant comments in a set of comments for a given article posted by an online content provider. In particular, FIGS. 1A and 1B demonstrate that a large number of articles have at least one irrelevant comment among the first 10 comments (as shown in FIG. 1A) or among the first 20 comments (as shown in FIG. 1B). The earlier these irrelevant comments can be removed, the less the visitors to the online content provider will be distracted. However, it can be difficult to measure the context-aware semantics and relevance of a comment at an early stage (e.g., within a relatively short time from the posting of the article), since there may be less than a sufficient number of comments to provide a context for the comment in question.

The disclosed systems and methods are directed to deriving context-dependent (e.g., context-aware) semantics of short texts, such that it is more accurate in relevance measurement than those derived without considering contexts (context-agnostic). The context-dependent semantics of a comment is determined by the semantic environment (surrounding texts) of the comment (such as the varying meaning of the word "space" in the above example). This disclosure addresses constructing a "native context" of a comment as the set of the comments posted for the same article and/or posting, since these comments are more likely to be similar to each other along various attributes, such as language, topics, terminology, etc. The constructed native contexts may be coupled with one or more language models to derive context-dependent semantics from such short comments.

In one embodiment, the disclosed systems and methods leverage a native context as a corpus and employ various language models, such as Latent Dirichlet Allocation ("LDA") or Singular Value Decomposition ("SVD") to find context-dependent latent topics of the comments. The native context as constructed herein assumes that there are sufficient comments posted for one article to serve as the context of a comment. The number of sufficient comments (e.g., a comment threshold) may be predetermined beforehand and, in various embodiments, may be a particular number of comments, a percentage of posted comments, a total word count of the comments posted, and other such metrics.

Shortly after an article is posted, there are generally relatively few comments. For most language models, having a few comments may be difficult to use in determining the topics associated with such comments. However, comments posted for articles having similar topics to the article in question are more likely to have similar usages of language. For example, the comments following articles on "real estate" are more likely to use the term "space" in the sense of "residential/commercial space" rather than "space exploration." Accordingly, in one embodiment, the disclosed systems and methods address transferring similar short texts from other articles of similar topics to construct "transferred contexts," which inherit the strength of native contexts but avoid the sparseness of contextual information. Having constructed a transferred context, the disclosed language models may then derive context-dependent semantics to determine whether a given comment associated with the article in question is relevant.

In view of the foregoing, the below example systems and methods are directed to determining whether a comment (e.g., a short section of text) following an article or posting is irrelevant to the article or posting. In particular, the disclosed systems and methods leverage a determined context for a set of comments to determine whether a given comment is irrelevant to the set of comments based on the determined context. Furthermore, the determined context may be a native context determined from the set of comments, or a transferred context determined from a second set of comments that are topically similar. The technical effect of such determined contexts, whether native or transferred, is that there is an increase in the overall accuracy by a language classifier in determining whether a comment selected from the set of comments is irrelevant.

In one embodiment, this disclosure provides for a method for detecting irrelevant texts, where the method includes selecting an article of interest from a plurality of articles, the article being associated with a first plurality of comments previously provided from one or more entities having accessed the article and extracting the first plurality of comments. In response to a determination that the first plurality of comments exceed a comment threshold, the method further includes determining a context-aware feature for a comment selected from the extracted first plurality of comments based on a context-aware topic distribution and a similarity between the selected comment and the selected article, applying a text classifier to the extracted one or more comments using the determined context-aware feature, the text classifier providing an indication of whether a given comment from the extracted plurality of comments is irrelevant, and in response to the applied text classifier, taking an action on the given comment based on the provided indication.

In addition, in response to a determination that the extracted one or more comments do not exceed the comment threshold, the method also includes extracting a second plurality of comments from a subset of articles selected from the plurality of articles, the extracted second plurality of comments being topical similar to the extracted first plurality of comments, defining a transferred context as a combination of the extracted first plurality of comments and the extracted second plurality of comments, determining a transferred context-aware feature for a comment selected from the first plurality of comments based on the transferred context and a similarity between the selected comment and the selected article, applying the text classifier to the extracted first plurality of comments using the determined transferred context-aware feature, the text classifier providing an indication whether a given comment from the extracted first plurality of comments is irrelevant, and in response to the applied text classifier, taking an action on the given comment based on the provided indication.

In another embodiment of the method, the method includes determining a transferred context-aware topic distribution of topics associated with the transferred context, wherein the determining of the transferred context-aware feature is based on the determined transferred context-aware topic distribution.

In a further embodiment of the method, the method includes determining a term-comment matrix for the first plurality of comments, the term-comment matrix identifying a plurality of terms found in the first plurality of comments, and applying a matrix factorization to the term-comment matrix to obtain the context-aware topic distribution of topics associated with the first plurality of comments.

In yet another embodiment of the method, the matrix factorization applied to the term-comment matrix comprises a non-negative matrix factorization.

In yet a further embodiment of the method, the similarity between the selected comment and the selected article is defined as $\cos(m_d, f_{SVD}^N(q_k^d))$, where:

$f_{SVD}^N(\cdot)$ is a vector-to-vector transformation obtained by decomposing the term-comment matrix using single value decomposition matrix factorization;

$q_k^d$ is a kth-comment selected from the extracted one or more comments of a dth-article selected from the plurality of articles; and $m_d$ is defined as $$\frac{\sum_{q \in Q^d} f_{SVD}^N(q)}{C_d},$$

where $Q^d$ is a term-document matrix constructed from the extracted one or more comments for the dth-article selected from the plurality of articles;

q is a comment selected from the extracted one or more comments; and $C_d$ is the number of extracted one or more comments associated with the selected article.

In another embodiment of the method, the action taken comprises identifying the given comment as an irrelevant comment based on the indication exceeding a previously established threshold, and removing the association of the given comment with the selected article.

In a further embodiment of the method, the action taken comprises identifying the given comment as an irrelevant comment based on the indication exceeding a first previously established threshold, and identifying the given comment for moderation by a reviewer based on the indication not exceeding a second previously established threshold.

This disclosure also describes a system for detecting irrelevant texts. In one embodiment, the system includes a non-transitory, computer-readable medium having computer-executable instructions stored thereon, and one or more processors in communication with the non-transitory, computer-readable medium that, having executed the computer-executable instructions, are configured to select an article of interest from a plurality of articles, the selected article being associated with a first plurality of comments previously provided from one or more entities having accessed the selected article and extract the first plurality of comments. The one or more processors are further configured to, in response to a determination that the first plurality of comments exceed a comment threshold, determine a context-aware feature for a comment selected from the extracted first plurality of comments based on a context-aware topic distribution and a similarity between the selected comment and the selected article, apply a text classifier to the extracted one or more comments using the determined context-aware feature, the text classifier providing an indication of whether a given comment from the extracted plurality of comments is irrelevant, and in response to the applied text classifier, take an action on the given comment based on the provided indication.

In addition, the one or more processors are further configured to, in response to a determination that the extracted one or more comments do not exceed the comment threshold, extract a second plurality of comments from a subset of articles selected from the plurality of articles, the extracted second plurality of comments being topical similar to the extracted first plurality of comments, define a transferred context as a combination of the extracted first plurality of comments and the extracted second plurality of comments, determine a transferred context-aware feature for a comment selected from the first plurality of comments based on the transferred context and a similarity between the selected comment and the selected article, apply the text classifier to the extracted first plurality of comments using the determined transferred context-aware feature, the text classifier providing an indication whether a given comment from the extracted first plurality of comments is irrelevant, and in response to the applied text classifier, take an action on the given comment based on the provided indication.

In another embodiment of the system, the one or more processors are further configured to determine a transferred context-aware topic distribution of topics associated with the transferred context, wherein the determining of the transferred context-aware feature is based on the determined transferred context-aware topic distribution.

In a further embodiment of the system, the one or more processors are further configured to determine a term-comment matrix for the first plurality of comments, the term-comment matrix identifying a plurality of terms found in the first plurality of comments, and apply a matrix factorization to the term-comment matrix to obtain the context-aware topic distribution of topics associated with the first plurality of comments.

In yet another embodiment of the system, the matrix factorization applied to the term-comment matrix comprises a non-negative matrix factorization.

In yet a further embodiment of the system, 12. The system of claim 10, wherein the similarity between the selected comment and the selected article is defined as $\cos(m_d, f_{SVD}^N(q_k^d))$ where:

$f_{SVD}^N(\cdot)$ is a vector-to-vector transformation obtained by decomposing the term-comment matrix using single value decomposition matrix factorization;

$q_k^d$ is a kth-comment selected from the extracted one or more comments of a dth-article selected from the plurality of articles; and $m_d$ is defined as $$\frac{\sum_{q \in Q^d} f_{SVD}^N(q)}{C_d},$$

where $Q^d$ is a term-document matrix constructed from the extracted one or more comments for the dth-article selected from the plurality of articles;

q is a comment selected from the extracted one or more comments; and $C_d$ is the number of extracted one or more comments associated with the selected article.

In another embodiment of the system, the action taken by the one or more processors comprises identifying the given comment as an irrelevant comment based on the indication exceeding a previously established threshold, and removing the association of the given comment with the selected article.

In a further embodiment of the system, the action taken by the one or more processors comprises identifying the given comment as an irrelevant comment based on the indication exceeding a first previously established threshold, and identifying the given comment for moderation by a reviewer based on the indication not exceeding a second previously established threshold.

This disclosure further describes a non-transitory, computer-readable medium having computer-executable instructions stored thereon that, when executed by one or more processors, cause the one or more processors to perform a method, the method comprising selecting an article of interest from a plurality of articles, the article being associated with a first plurality of comments previously provided from one or more entities having accessed the article, extracting the first plurality of comments, in response to a determination that the first plurality of comments exceed a comment threshold, determining a context-aware feature for a comment selected from the extracted first plurality of comments based on a context-aware topic distribution and a similarity between the selected comment and the selected article, applying a text classifier to the extracted one or more comments using the determined context-aware feature, the text classifier providing an indication of whether a given comment from the extracted plurality of comments is irrelevant, and in response to the applied text classifier, taking an action on the given comment based on the provided indication.

The method further includes, in response to a determination that the extracted one or more comments do not exceed the comment threshold, extracting a second plurality of comments from a subset of articles selected from the plurality of articles, the extracted second plurality of comments being topical similar to the extracted first plurality of comments; defining a transferred context as a combination of the extracted first plurality of comments and the extracted second plurality of comments, determining a transferred context-aware feature for a comment selected from the first plurality of comments based on the transferred context and a similarity between the selected comment and the selected article, applying the text classifier to the extracted first plurality of comments using the determined transferred context-aware feature, the text classifier providing an indication whether a given comment from the extracted first plurality of comments is irrelevant, and in response to the applied text classifier, taking an action on the given comment based on the provided indication.

In another embodiment of the non-transitory, computer-readable medium of claim, the method further comprises determining a transferred context-aware topic distribution of topics associated with the transferred context, wherein the determining of the transferred context-aware feature is based on the determined transferred context-aware topic distribution.

In a further embodiment of the non-transitory, computer-readable medium, the method further comprises determining a term-comment matrix for the first plurality of comments, the term-comment matrix identifying a plurality of terms found in the first plurality of comments, and applying a matrix factorization to the term-comment matrix to obtain the context-aware topic distribution of topics associated with the first plurality of comments.

In yet another embodiment of the non-transitory, computer-readable medium the similarity between the selected comment and the selected article is defined as $\cos(m_d, f_{SVD}^N(q_k^d))$, where:

$f_{SVD}^N(\cdot)$ is a vector-to-vector transformation obtained by decomposing the term-comment matrix using single value decomposition matrix factorization;

$q_k^d$ is a kth-comment selected from the extracted one or more comments of a dth-article selected from the plurality of articles; and $m_d$ is defined as $$\frac{\sum_{q \in Q^d} f_{SVD}^N(q)}{C_d},$$

where $Q^d$ is a term-document matrix constructed from the extracted one or more comments for the dth-article selected from the plurality of articles;

q is a comment selected from the extracted one or more comments; and $C_d$ is the number of extracted one or more comments associated with the selected article.

In yet a further embodiment of the non-transitory, computer-readable medium, the action taken includes identifying the given comment as an irrelevant comment based on the indication exceeding a previously established threshold, and removing the association of the given comment with the selected article.

In another embodiment of the non-transitory, computer-readable medium, the action taken includes identifying the given comment as an irrelevant comment based on the indication exceeding a first previously established threshold, and identifying the given comment for moderation by a reviewer based on the indication not exceeding a second previously established threshold.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 2:
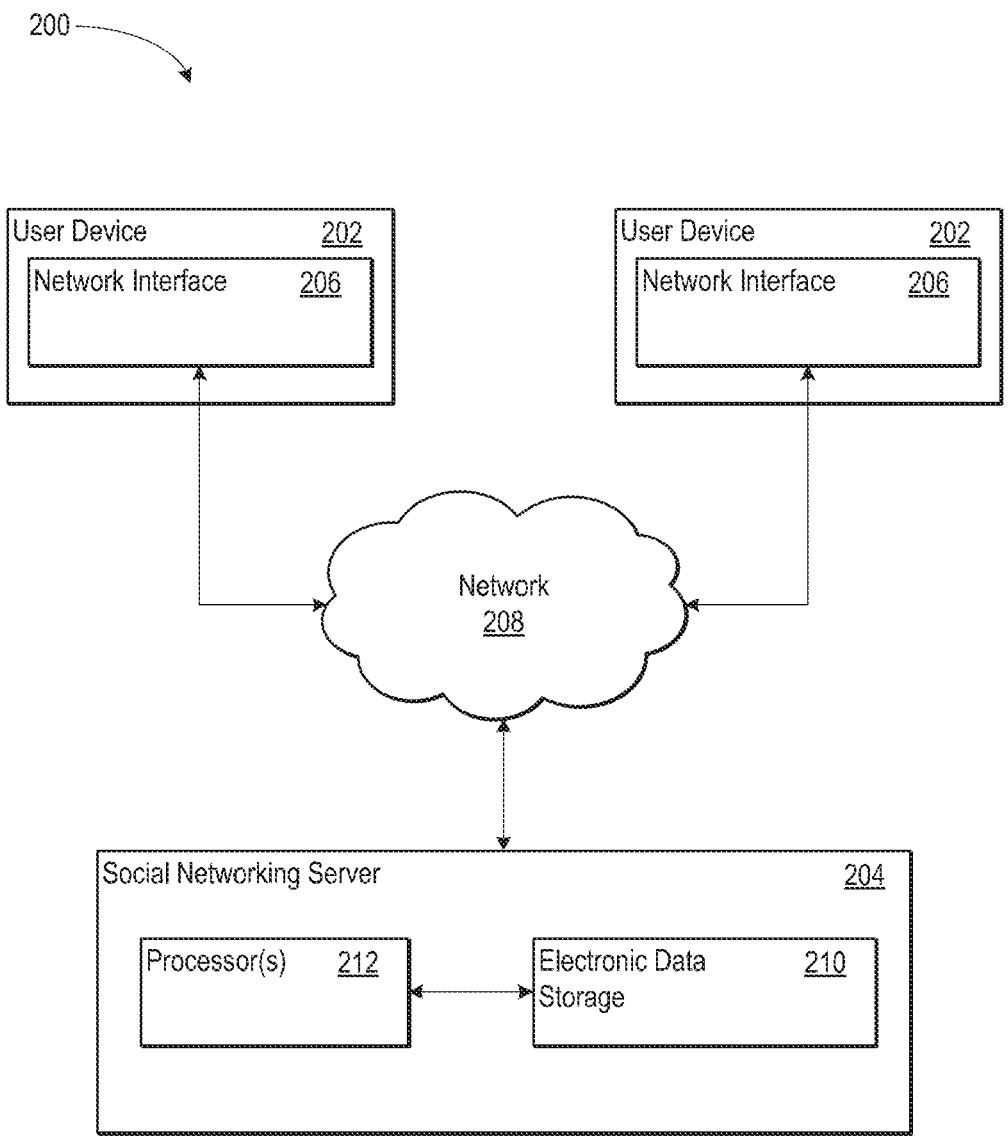
FIG. 2 is a block diagram of a system in accordance with an example embodiment, including user devices and a social networking server.

FIG. 2 is a block diagram of a system 200 in accordance with an example embodiment, including user devices 202 and a social networking server 204. In one embodiment, a particular type of social networking server 204 may be referred to as a business network server. User devices 202 may be a personal computer, netbook, electronic notebook, smartphone, or any electronic device known in the art that is configured to display web pages. The user devices 202 may include a network interface 206 that is communicatively coupled to a network 208, such as the Internet.

The social networking server 204 may be communicatively coupled to the network 208. The server 204 may be an individual server or a cluster of servers, and may be configured to perform activities related to serving a social networking service, such as storing social network information, processing social network information according to scripts and software applications, transmitting information to present social network information to users of the social network service, and receive information from users of the social network service. The server 204 may include one or more electronic data storage devices 210, such as a hard drive, optical drive, magnetic tape drive, or other such non-transitory, computer-readable media, and may further include one or more processors 212.

The one or more processors 212 may be any type of commercially available processors, such as processors available from the Intel Corporation, Advanced Micro Devices, Texas Instruments, or other such processors. Furthermore, the one or more processors 212 may be of any combination of processors, such as processors arranged to perform distributed computing via the server 204.

The social networking server 204 may store information in the electronic data storage device 210 related to users and/or members of the social network, such as in the form of user characteristics corresponding to individual users of the social network. For instance, for an individual user, the user's characteristics may include one or more profile data points, including, for instance, name, age, gender, profession, prior work history or experience, educational achievement, location, citizenship status, leisure activities, likes and dislikes, and so forth. The user's characteristics may further include behavior or activities within and without the social network, as well as the user's social graph. In addition, a user and/or member may identify an association with an organization (e.g., a corporation, government entity, non-profit organization, etc.), and the social networking server 204 may be configured to group the user profile and/or member profile according to the associated organization.

The social networking server 204 may also store information in the electronic data storage device 210 related to one or more organizations. The information about an organization may include a name of the organization, offered products for sale, available job postings, organizational interests, forthcoming activities, articles of interest and the like. Using the social networking server 204, a member of the organization may disseminate one or more articles of interest to one or more members of the social networking server 204. The articles of interest may include upcoming products and/or services provided by the organization, events being hosted by the organization, news that may be relevant to the organization, and other such articles of interest. In one embodiment, members of the social networking service may subscribe to the postings of the organization such that a subscribing member (e.g., a "subscriber") receives updated articles of interest that the organization has published. Furthermore, as the organization may desire feedback from subscribing members or other members (e.g., members who have not yet subscribed to the organization but are viewing the articles of interest provided by the organization), the organization may allow one or members to provide comments on the published article of interest.

The social networking server 204 may include one or more applications to provide articles of interest to members and/or applications to facilitate the publication of such articles by various organizations that also use the social networking server 204. These applications may include a publication application, a commenting application, an authoring application, and other such applications directed to the publication and dissemination of articles that may be of interest to members of the social networking server 204. The social networking server 204 may also provide other utilities and applications, such as a search utility to help members quickly find organizations in which they may be interested or to find articles about topics in which they may be interested.

The one or more applications of the social networking server 204 may execute in real-time or as a background operation, such as offline or as part of a batch process. In some examples that incorporate relatively large amounts of data to be processed, the one or more applications may execute via a parallel or distributed computing platform.

Figure 3:
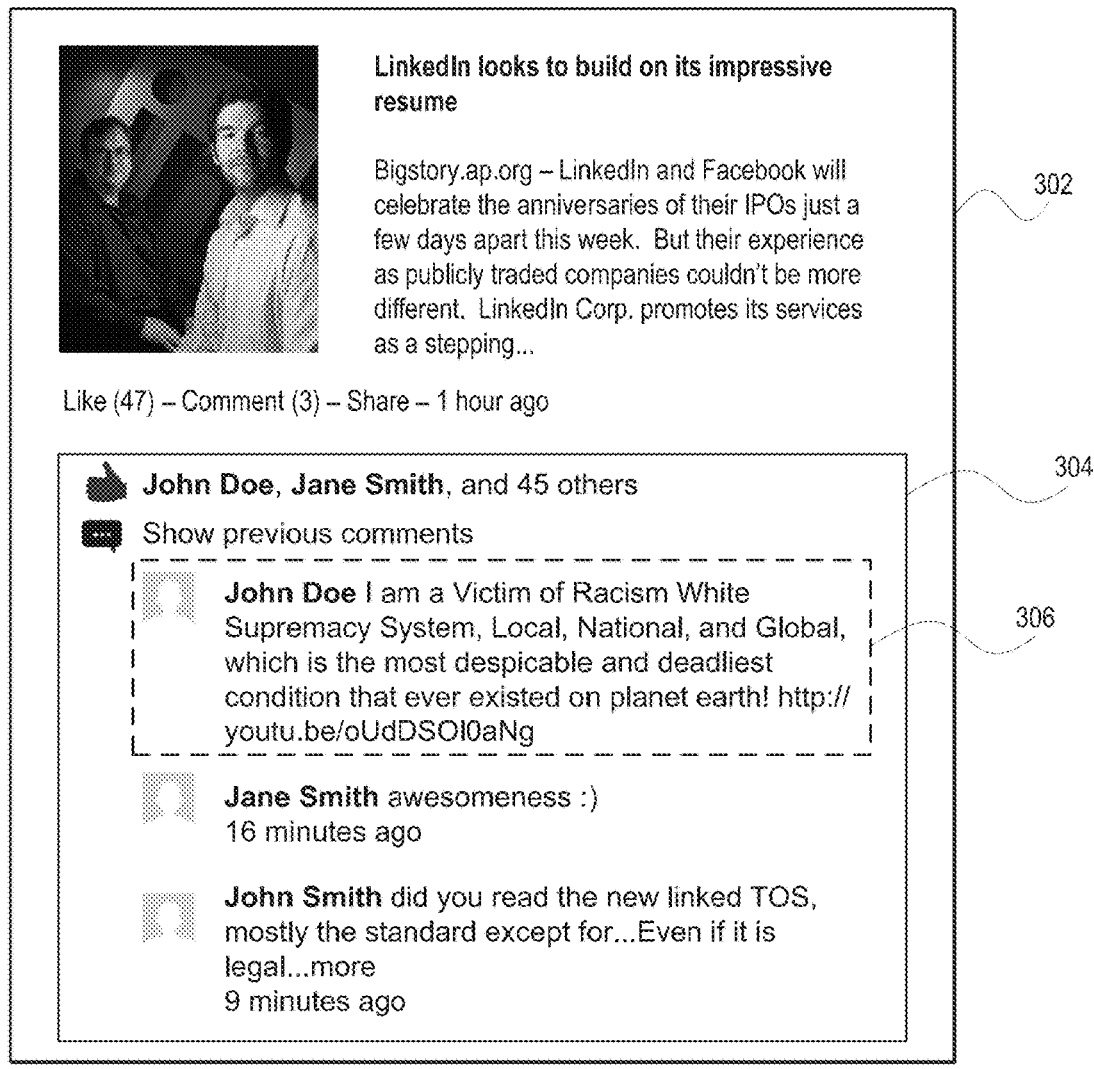
FIG. 3 illustrates an irrelevant comment, in accordance with an example embodiment, following an article posted by an online content provider.

As discussed above, the social networking server 204 may facilitate the display of articles by an organization that members of the social networking service may find interesting or relevant. While the organization may desire feedback from members of the social networking service, not every comment provided by a member will be relevant to the article provided by the organization. FIG. 3 illustrates an irrelevant comment 306, in accordance with an example embodiment, following an article 302 posted by an online content provider. The article 302 may include various comments 304, which may be associated with the article 302 and may have been provided by various members of the social networking service. Furthermore, the comments may be stored by the social networking server 204 such that the comments may be displayed at later times when a member requests the display of the article 302. While some of the comments 304 following the article 302 may be relevant to the article 302, there may be some comments that are irrelevant and should be removed.

Figure 4A:
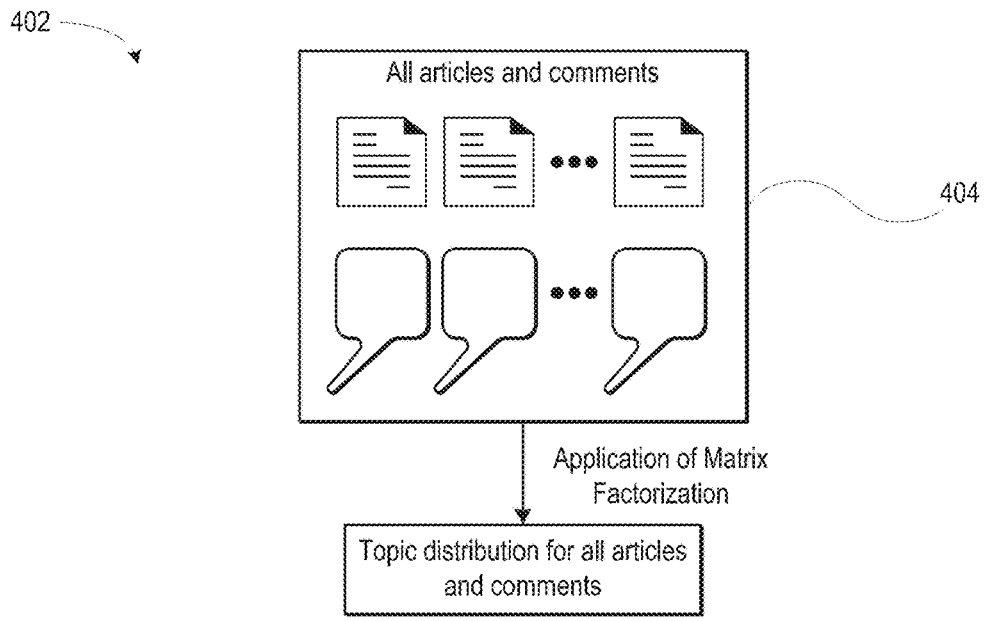
FIGS. 4A-4C illustrate various techniques, in accordance with example embodiments, for determining whether a given comment following a posted article is irrelevant.
Figure 4B:
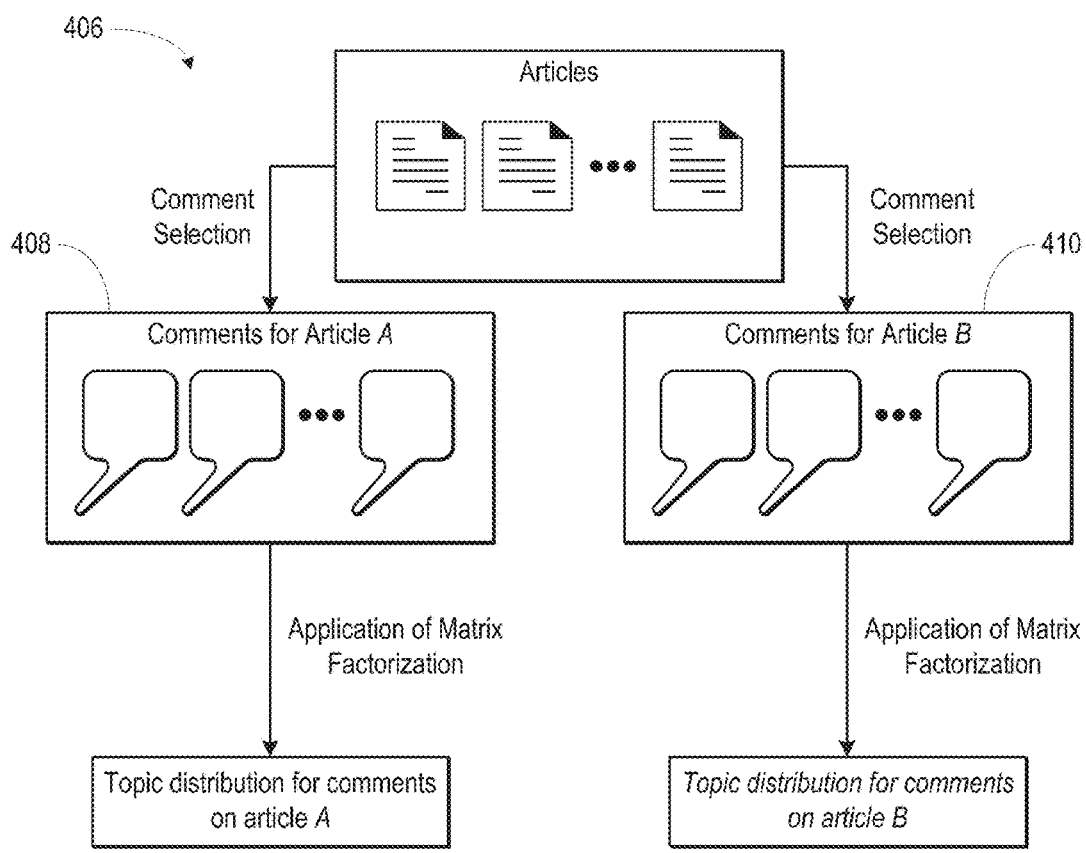
Figure 4C:
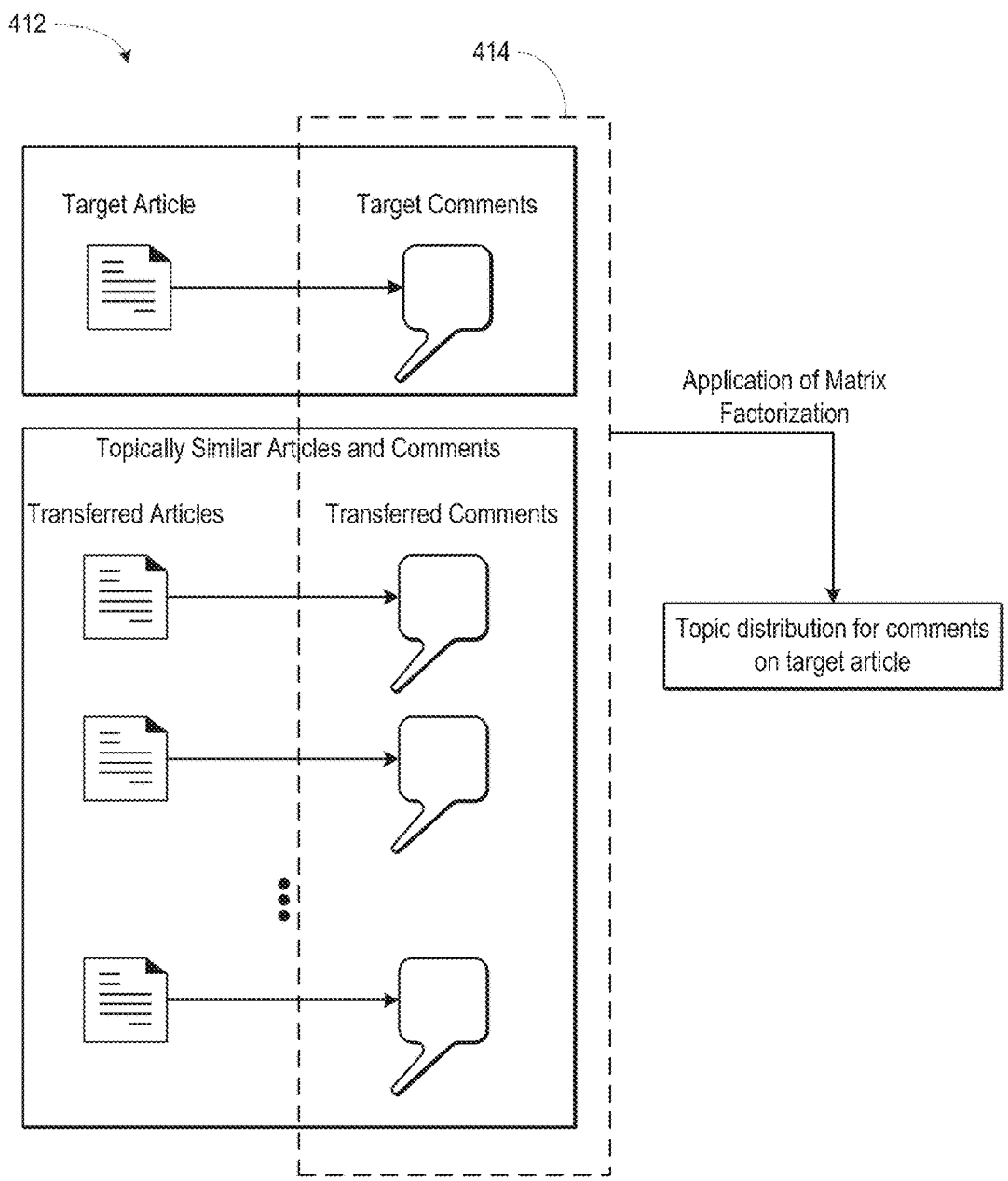

There are several techniques directed to the detection and removal of irrelevant comments. FIGS. 4A-4C illustrate various techniques, in accordance with example embodiments, for determining whether a given comment following a posted article is irrelevant. Referring to FIG. 4A, a first technique 402 is determining various context agonistic features to determine whether a given comment from a set of comments is irrelevant. In the context agnostic technique 402, a text classifier considers all the words from all available (or provided) articles and comments 404 in determining whether a given comment is irrelevant for a specific article. As discussed below with reference to equation 1 and equation 2, the context agnostic technique 402 may leverage various language models to determine the one or more context agnostic features.

Another technique 406 is determining a native context-aware feature to then determine whether the given comment is irrelevant. With the native context aware technique 406, a native context feature is determined for each set of comments 408,410 associated with a given article. Moreover, the native context aware technique 406 considers the comments 408,410 associated with their respective articles in determining the native context-aware feature rather than the entirety of the comments.

Referring to FIG. 4C, a third technique 412, a transferred context aware technique, is to consider comments 414 that are topically similar to a given comment. With this technique 412, topically similar comments may be first identified, and then a transferred context feature may be determined from the topically similar comments and the given comment.

More formally, assume an article $w_d \in W = \{w_1, \ldots, w_D\}$ is followed by a set of $C_d$ comments $Q_d = \{q_1^d, \ldots, q_{C_d}^d\}$. With this formulation, $w_d = \{w_{dn}\}_{n=1}^{N_d}$ and $q_k^d = \{q_{kn}^d\}_{k=1}^{N_k^d}$ are the vectors of words of the dth article and the kth comment for the dth article, respectively. $N_d$ and $N_k^d$ k are the lengths of the article and the comment, respectively. Further assume that $f(\cdot)$ is a language model, which is a transformation from a bag-of-word ("BOW") vector representation of an article (or other body of words) to another vector representation. Various language models may be used to obtain a topic distribution based on the bag-of-word vector representation, such as LDA, SVD, non-negative matrix factorization (NMF), and other such language models. In general, LDA maps a document to a vector of topic distribution, while an identity transformation is a bag-of-word vector of a document. Obtaining a topic distribution of the comments following an article (or comments following one or more articles) and/or the article itself (or articles) may be useful as it can capture the different meanings of the words used in the comments, especially when there are few comments associated with a given article. Given a transformation $f(\cdot)$, a context agnostic feature is calculated as the cosine similarity between the given comment ($f(q_k^d)$) and the article ($f(w_d)$), and the mean of $\{f(q_1^d), \ldots, f(q_{C_d}^d)\}$. This may be represented by the following two equations:

$$\cos(f(w_d), f(q_k^d)) = \frac{\langle f(w_d), f(q_k^d) \rangle}{\|f(w_d)\| \cdot \|f(q_k^d)\|} \quad \text{(eq. 1)}$$

$$\cos(m_d, f(q_k^d)) = \frac{\langle m_d, f(q_k^d) \rangle}{\|m_d\| \cdot \|f(q_k^d)\|} \quad \text{(eq. 2)}$$

where $m_d$ is the center of all transformed vectors of the comments following the article $w_d$. $m_d$ may be represented by the following equation:

$$m_d = \frac{\sum_{q \in Q^d} f(q)}{C_d} \quad \text{(eq. 3)}$$

In this disclosure, equation 1 may be referred to as the "comment-to article" irrelevance feature and equation 2 may be referred to as the "comment-to-center" irrelevance feature. Table 1 below provides explanations regarding the notations used in equation 1 and equation 2.

TABLE 1

| Symbol | Meaning |
|---|---|
| W | a collection of articles |
| $w_d$ | an article d selected from the articles W |
| $Q^d$ | a collection of comments associated with the article d |
| $q_k^d$ | a comment k selected from the comments $Q^d$ |
| $C_d$ | the number of comments associated with the article d |
| $N_d$ | the length of the article d |
| D | the size of W |
| $\|\cdot\|_F$ | the Frobenius norm of a matrix |
| $<\cdot,\cdot>$ | an inner product |
| $f(\cdot)$ | a transformation defining a langua |

Based on the foregoing detection techniques and equations 1 and 2, this disclosure further provides for several irrelevant comment detection features, which are summarized in Table 2 below. These detection features are then used by a text classifier to determine whether a given comment is irrelevant in view of a set of comments.

TABLE 2

| Feature | Context | Transformation | Mean | Article |
|---|---|---|---|---|
| $\sigma_1$ | Agnostic | $f_{bow}$ | X | X |
| $\sigma_2$ | Agnostic | $f_{lda}$ | X | X |
| $\sigma_3$ | Agnostic | $f_{svd}$ | X | X |
| $\sigma_4$ | Agnostic | $f_{nmf}$ | X | X |
| $\sigma_5$ | Native | $f_{svd}^N$ | X | |
| $\sigma_6$ | Transferred | $f_{svd}^C$ | X | |

In Table 2, each row specifies a feature (e.g., $\sigma_1$, $\sigma_2$, etc.), the language model used to determine that feature, and whether equation 1 or equation 2 is used. A mark in the "Mean" column indicates equation 2 and a mark in the "Article" column indicates equation 1.

With particularity, $\sigma_1$ is a context agnostic feature determined using a bag-of-words language model and each of equations 1 and 2, $\sigma_2$ is also a context agnostic feature determined using an LDA language model and each of equations 1 and 2, $\sigma_3$ is a further context agnostic feature determined using an SVD language model and each of equations 1 and 2, and $\sigma_4$ is another context agnostic feature determined using an NMF language model and each of equations 1 and 2. In contrast, $\sigma_5$ is a context-aware feature determined using an SVD language model applied to neighboring comments of a given comment and equation 2. Finally, $\sigma_6$ is a transferred context feature determined using an SVD language model applied to comments that are topically similar to a given comment and equation 2.

As an article generally establishes the topics that discussed by comments that follow, these comments should have similar usages of language (e.g., similar usages of a word, especially homonyms). Therefore, when presented with a set of articles, each article forms a natural group of comments, where the group defines a context for the comments within the group. By training a language model (e.g., a transformation) using the contexts for the comments, then the context-dependent semantics of the comments are better captured.

Assuming that the native language context (NLC) of a comment, represented by $q_k^d$, is the context of the neighboring comments following the same article as $q_k^d$, then the set of comments having the same context may be defined as $Q^d$. This relationship may be defined as:

$$NLC(q_k^d) = Q^d \quad \text{(eq. 4)}$$

To determine a context-aware language model for $q_k$, one or more matrix factorization techniques may be applied to $Q^d$. In general, a matrix factorization applied to a corpus of documents (e.g., the articles as discussed herein), modeled as a term-document matrix W, factorizes the term-document matrix into a product of two or three matrices. For example, in Latent Semantic Indexing ("LSI") or SVD, $$W = U\Sigma V^T \quad \text{(eq. 5)}$$

where U and V are the left and right matrices, respectively, of singular vectors and $\Sigma$ is the diagonal singular value matrix. In equation 5, the matrix U provides the topic distributions of words and the matrix V provides the topic distributions of documents. Given this formulation, the vector transformation function may be defined by $f_{svd}(w_d) = V_d$, where $V_d$ is the dth row of V.

Assuming that a term-document matrix is constructed from $Q^d$ discussed above (e.g., a term-document matrix constructed from $q_k^d$ and its neighboring comments), application of SVD to the term-document matrix yields:

$$Q^d = U^d \Sigma (V^d)^T \quad \text{(eq. 6)}$$

In equation 6, $Q^d$ identifies both the set of comments and the term-document matrix constructed from the set. Equation 6 further uses the superscript d to emphasize that the decomposition depends on the neighboring comments of the comment $q_k^d$ rather than all of the comments in from the articles. The resulting factor matrix $V^d$ gives a context-aware topic distribution of the comments:

$$f_{svd}^N(q_k^d) = V_k^d \quad \text{(eq. 7)}$$

where $V^d$ is the kth row of $V^d$ and $f_{svd}^N(\cdot)$ is the vector-to-vector transformation obtained by decomposing the native context N (e.g., the set of comments $Q^d$) using SVD. The native context irrelevant comment detection feature (e.g., $\sigma_5$) is then determined by using $f_{svd}^N(\cdot)$ in the "comment-to-center" equation (e.g., equation 2) and equation 3:

$$\cos(m_d, f_{svd}^N(q_k^d)), \text{ where } m_d = \frac{\sum_{q \in Q^d} f_{svd}^N(q)}{C_d} \quad \text{(eq. 8)}$$

In equation 8, use of the article $w^d$ associated with the comment $q_k^d$ is avoided because the length of the article $w^d$ and its associated comment can differ dramatically such that the decomposition will be biased to favor the article. Thus, and referring back to FIG. 4A and FIG. 4B, technique 402 and technique 406 differ in that a single SVD may be applied to a single term-document matrix constructed from the comments and articles 404 whereas multiple SVDs may be performed for multiple term-document matrices constructed from different sets of comments.

One of the challenges with leveraging a native context to determine whether a comment is irrelevant is that there may not be a sufficient number of comments to build a native context. Accordingly, this disclosure further provides for building a transferred context for a given comment, which is illustrated in FIG. 4C. In building a transferred context, the presumption is that articles of similar topics are likely to be followed by comments of the same topics, with similar usage of language. For example, the term "space" in the comments following several articles on "real estate" is likely to unambiguously refer to "a continuous area for human daily activities", instead of "the physical universe around the Earth." Building a transferred context is made possible since websites typically retain previously posted articles and their associated comments. Unsurprisingly, there are drifts in concepts and distributions in the comments from article to article, so that not all previously stored comments are useful for building a transferred context. To address this deficiency, the disclosed technique focuses on comments that are most similar to the comments of a given article.

Constructing a transferred context and determining its corresponding feature (e.g., $\sigma_6$) described in the pseudo-code below. In summary, compared to native contexts, transferred contexts resolve comment deficiency by searching for comments having a similar context, while compared to context agnostic approaches, transferred contexts allow language models to define context aware semantics.

Begin Pseudo-Code:

---

Input: An article w with its comments $Q = \{q_1, ..., q_C\}$, a collection of past articles $\{w_d\}_{d=1}^D$ and associated comments $\{Q^d\}_{d=1}^D$
Output: Irrelevant comment feature $\sigma_6$ for $q_k \in Q$.
1.     Perform LDA on $\{w\} \cup \{w_d\}_{d=1}^D \cup Q \cup \{Q^d\}_{d=1}^D$
2.     Retrieve top l most similar articles to w from $\{w_d\}_{d=1}^D$, denoted by $R = \{w'_1, \ldots, w'_l\}$.
3.     for $q_i \in Q$ do
4.         Retrieve threshold set of comments (e.g., top 50%) most similar to $q_i$ from the comments associated with the articles in R.
5.     end for
6.     Define a transferred context C for Q as the union of the retrieved comments and Q.
7.     Apply matrix factorization (e.g., SVD) to the transferred context to find context-dependent semantics of Q.
8.     Return $\sigma_6$, determined using equation 2 and equation 3, where $f_{svd}^C(\cdot)$ is SVD applied to the set of C comments.

---

Figure 5:
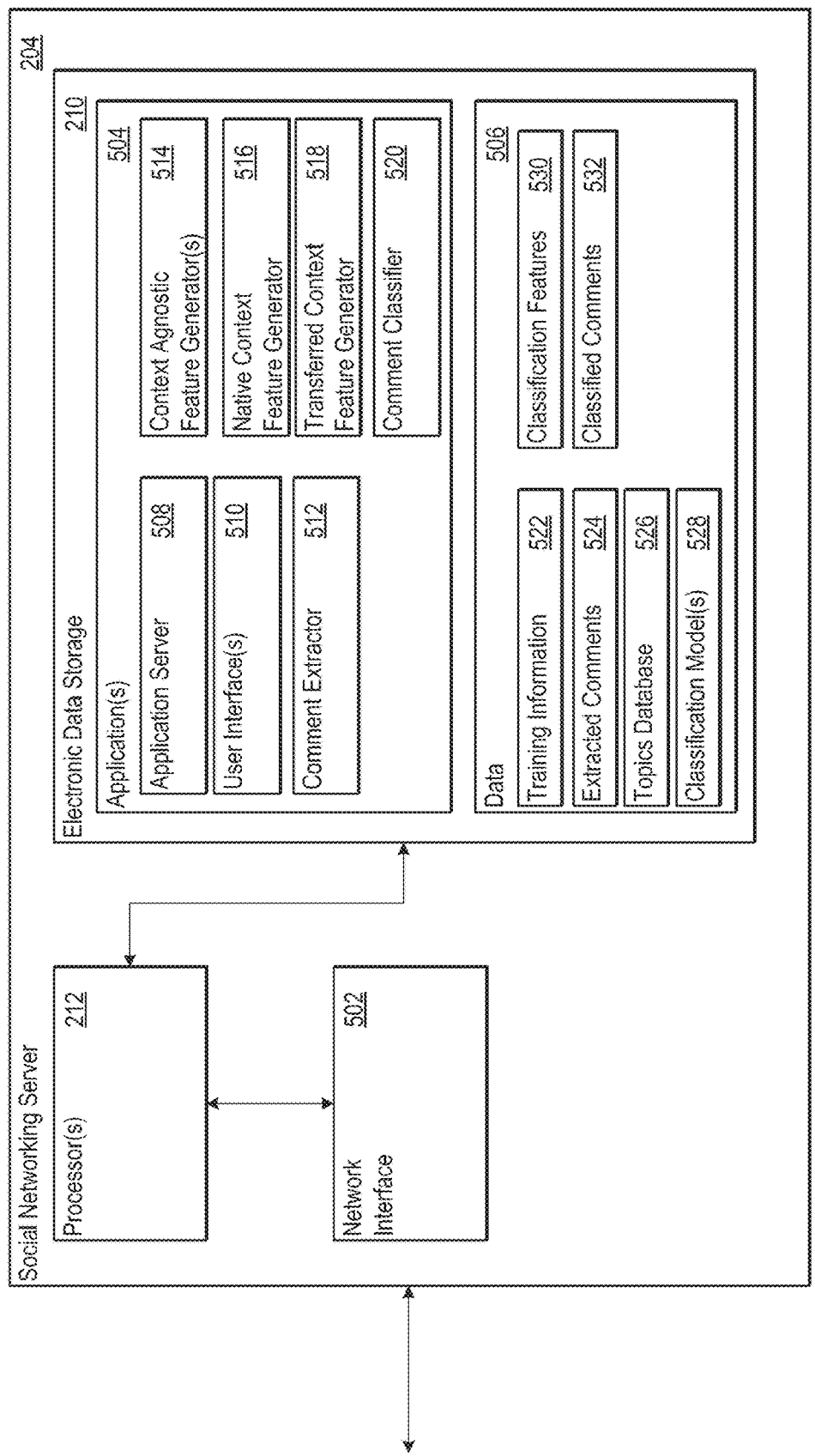
FIG. 5 is a block diagram illustrating various components of a social networking server in accordance with an example embodiment.

The foregoing models and constructs may be performed by the social networking server 104 on any of the articles it hosts. FIG. 5 is a block diagram illustrating various components of a social networking server 204 in accordance with an example embodiment. In one embodiment, the social networking server 204 may include one or more processor(s) 212, one or more network interface(s) 502, one or more application(s) 504, and data 506 used by the one or more application(s) 204 stored in the electronic data storage 210.

As is understood by skilled artisans in the relevant computer and Internet-related arts, application(s) 504 shown in FIG. 5 may represent a set of executable software instructions and the corresponding hardware (e.g., memory and processor) for executing the instructions. To avoid obscuring the subject matter with unnecessary detail, various applications that are not germane to conveying an understanding of the inventive subject matter have been omitted from FIG. 5. However, a skilled artisan will readily recognize that various additional applications, engines, modules, etc., may be used with a social networking server 204 such as that illustrated in FIG. 5, to facilitate additional functionality that is not specifically described herein. Furthermore, the various applications depicted in FIG. 5 may reside on a single server computer, or may be distributed across several server computers in various arrangements.

The front end of the social networking server 204 may be provided by one or more user interface application(s) 510, which may receive requests from various client computing devices, and may communicate appropriate responses to the requesting client devices. For example, the user interface application(s) 510 may receive requests in the form of Hypertext Transport Protocol (HTTP) requests, or other web-based, application programming interface (API) requests. An application server 508 working in conjunction with the one or more user interface application(s) 510 may generate various user interfaces (e.g., web pages) with data retrieved from various data sources stored in the data 506. In some embodiments, individual application(s) (e.g., applications 508-520) may be used to implement the functionality associated with various services and features of the system 200. For instance, extracting one or more comments associated with one or more articles hosted by the social networking server 204 may be performed by a comment extractor 512. As another example, determining the various context-agnostic features may be performed by an agnostic context feature generator(s) 514. In one embodiment, the context agnostic feature generator 514 generates the previously discussed context agnostic irrelevant comment features (e.g., $\sigma_1$, $\sigma_2$, $\sigma_3$, and $\sigma_4$ for a given comment based on a given language model (e.g., SVD, LDA, NMF, etc.), equation 1, and equation 2. As a further example, the native context feature generator 516 may generate the native context irrelevant comment feature (e.g., $\sigma_5$) for a given comment based on a given language model and equation 2. Furthermore, the transferred context feature generator 518 may generate a transferred context irrelevant comment feature (e.g., $\sigma_6$) for a given comment based on a given language model, equation 2, and according to the pseudo-code discussed previously.

The social networking server 204 may also include data 506, which may include one or more databases or other data stores that support the functionalities of the applications 508-520. In particular, data 506 may include training information 522, one or more extracted comments 524, various topics stored in a topic database 526, one or more classification models 528, the various determined classification features 530 (e.g., the context-agnostic features, the native context feature, and the transferred context feature), and one or more classified comments 532. While shown as being housed in the same box as application(s) 504, it should be understood that data 506 may be housed in another location or across locations (e.g., in a distributed computing environment).

Training information 522 may include data used to train one or more linear and/or non-linear classifiers. For example, the training information 522 may be used to train a Support Vector Machine ("SVM") classifier, a K-Nearest Neighbor ("kNN") classifier, a naïve Bayes classifier, or other such classifier. The training information 522 may be obtained by extracting comments from one or more articles hosted by the social networking server 204 (e.g., via the comment extractor 512), manually classifying each of the comments as relevant or irrelevant, and then providing such classifications to the classifier being trained.

The extracted comments 524 may include one or more comments extracted from one or more articles hosted by the social networking server 204. Alternatively or additionally, the extracted comments 524 may be obtained from other articles hosted by other online providers, such as in the case where a transferred context is desired (e.g., the number of comments associated with a given article is less than a sufficient number to determine a native context).

The topics database 526 may include one or more topics used to identify the topics discussed in one or more of the extracted comments 524. In one embodiment, the topics database 526 includes at least 20 topics, which may then be used by one or more language models (e.g., SVD, NMF, LDA, etc.) to construct a topic distribution of the extracted comments 524. In another embodiment, the topics are manually determined. In yet further embodiments, a classifier may be trained to identify topics given one or more words, and the classifier may be applied to the extracted comments 524.

The classification model(s) 528 include the classification models used to classify one or more comments as irrelevant. The classification model(s) 528 may also include one or more of the language models (e.g., SVD, NMF, LDA, etc.) used by the feature generators 514-518 to determine one or more topic distribution matrices for the extracted comments 524. As discussed below, the classification model(s) 528 may accept the various determined irrelevant comment features (e.g., the context-agnostic features, the native context-aware feature, and the transferred context-aware feature) as input to facilitate the classification of the extracted comments 524.

The classification features 530 may include the determined irrelevant comment features. The classification features 530 may further include additional features that a classifier may accept as input, such as the output of a maximum entropy text classifier, the length of the various comments, and/or other such features.

Finally, the classified comments 532 include the comments that have been assigned a classification, such as irrelevant or relevant. The classified comments 532 may also include classified comments requiring further review by a moderator. For example, the comment classifier 520 may assigned a given comment a particular irrelevant comment probability value, and the assigned irrelevant comment probability value may be compared with various probability thresholds. A first probability threshold may be established that indicates that there is a high likelihood (e.g., 90% probability, 80% probability, etc.) that a given comment is irrelevant and a second probability threshold may be established that indicates that there is a low likelihood (e.g., 10% probability, 20% probability, etc.) that a given comment is irrelevant. For those comments having an assigned irrelevant comment probability value that falls between these two thresholds, the comment classifier 520 may identify that these comments as needing moderation. In one embodiment, a moderator may confirm whether a comment identified as needing moderation is, in fact, irrelevant.

FIGS. 6A-6E are graphs 602-610 illustrating the improvement in accuracy for various language models using a first native context-aware feature determined, in accordance with an example embodiment, for a first set of articles. FIGS. 7A-7E are graphs 702-710 illustrating the improvement in accuracy for various language models using a second native context-aware feature determined, in accordance with an example embodiment, for a second set of articles. The first set of articles were acquired from a news channel provided by an online provider (e.g., LinkedIn.com). For the first set of articles ("the News dataset"), a baseline set of features were used to train various classifiers. The baseline set of features included social network connections and certain text features that were not derived from semantic relevance, such as the lengths of the comments, containment of any sensitive keywords, and other such features. The output of a maximum entropy text classifier was also used as an additional feature.

For the second set of articles, article postings and their associated comments ("the Blog dataset") were obtained from a second online provider (e.g., Digg.com). For the Blog dataset, 50% of the comment-article pairs were used as training data for various classifiers (e.g., SVM, kNN, naïve Bayes, etc.) were trained with the training data. The predictions of the trained classifiers (e.g., whether a given comment was irrelevant) were used as baseline features.

To derive the context-agnostic features shown in Table 2 above, (e.g., feature $\sigma_1, \ldots, \sigma_4$), an LDA model was trained using all the articles from the Blog dataset, and then topics were predicted for the comments associated with their corresponding articles. In particular, a term-document matrix was constructed using all the articles and the comments, and then matrix factorization was performed (e.g., SVD and NMF) to decompose the resulting matrix and obtain topics for the articles and their associated comments. While the number of topics in was fixed at 50 (without parameter searching), a number of topics could have been used. For both datasets (e.g., the News dataset and the Blog dataset), the foregoing context-agnostic features were treated as baseline features.

To demonstrate that a determined native context can improve the predictive accuracy of various context-agnostic methods, the classification performance of the baseline features were compared with and without the usage of the $\sigma_5$ feature. In this demonstration, 20 topics were established and used in equation 6 above. While 20 topics were chosen (e.g., as there may be less articles in native contexts), any number of topics could have been used. For various selected context-agnostic methods of determining topics (e.g., BOW, LDA, SVD, and NMF), the topics for the comments from the News and Blog dataset were determined both with and without the $\sigma_5$ feature. In summary, and as shown in FIGS. 6A-6E and FIGS. 7A-7E, there were five different combinations of features for the two datasets (e.g., $\sigma_1$ and $\sigma_5$; $\sigma_2$ and $\sigma_5$; $\sigma_3$ and $\sigma_5$; $\sigma_4$ and $\sigma_5$; and $\sigma_1, \sigma_2, \sigma_3, \sigma_4$, and $\sigma_5$).

To evaluate the various sets of features, the random forest implementation in sklearn (http://scikit-learn.org) was used. Random forest was used as it is effective for evaluating datasets where there is an imbalance two-class problems, as is the case with the News and Blog datasets. For each forest, 100 random trees were generated, each of which were allowed to grow to its full depth. The performance of random forest was evaluated using 10-fold cross-validation. For a performance metric, an Area Under Precision-Recall Curve ("AUPRC") was developed as it is desirable to achieve high precisions with low recalls. Furthermore, one can adjust the cost of false negatives in imbalance classification problems. Therefore, with the weight of negative instances fixed at one, different weights were given to positive instances, ranging from one to nine with a stepsize of one. Random decision trees gracefully take care of the weights.

FIGS. 6A-6E (e.g., the performance charts for the News dataset) and FIGS. 7A-7E (e.g., the performance charts for the Blog dataset), demonstrate the performance of various signal combinations. In each of FIGS. 6A-6E and FIGS. 7A-7E, one can observe that the features $\sigma_i$, i=1, ..., 4 improve the detection performance based on the rest of the baseline features. This shows that the similarity between the usage of words or topics of a comment and the proceeding article or surrounding comments significantly improve the performance of the classifier. Further, it was demonstrated that the bag-of-words model ($f_{bow}$) outperformed any other single dimension reduction methods (e.g., $f_{lda}$, $f_{svd}$ or $f_{nmf}$) that tries to capture the topics of the comments. This is because comments are usually too short and provide insufficient information for topic models to robustly infer the underlying topics.

Figure 7A:
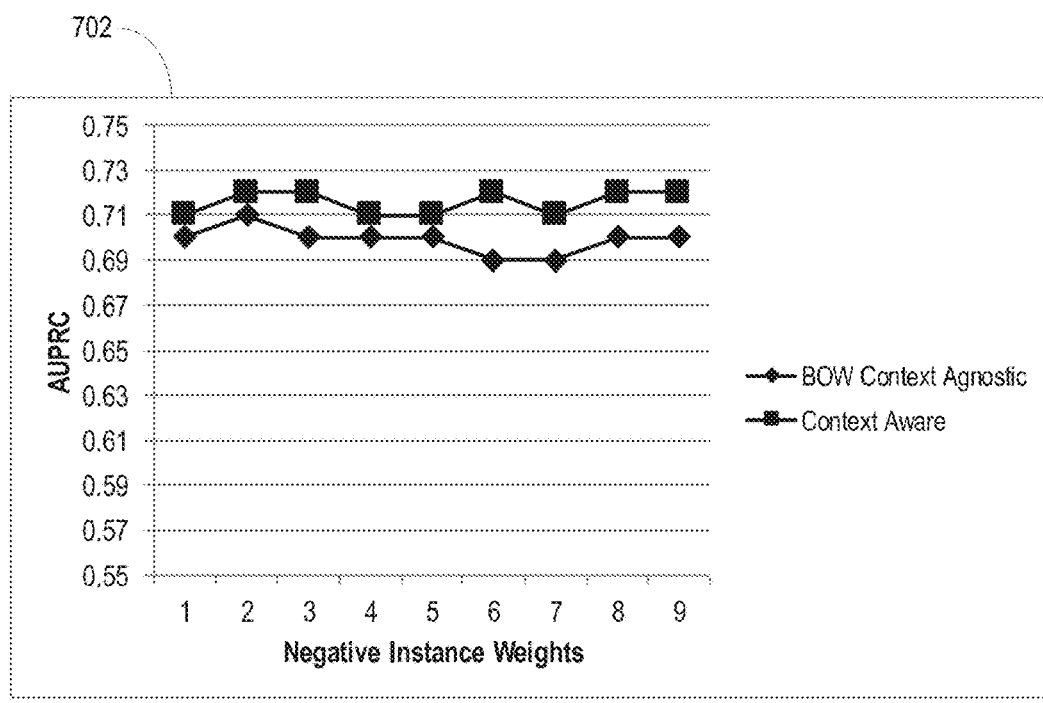
FIGS. 7A-7E are graphs illustrating the improvement in accuracy for various language models using a second native context-aware feature determined, in accordance with an example embodiment, for a second set of articles.
Figure 7B:
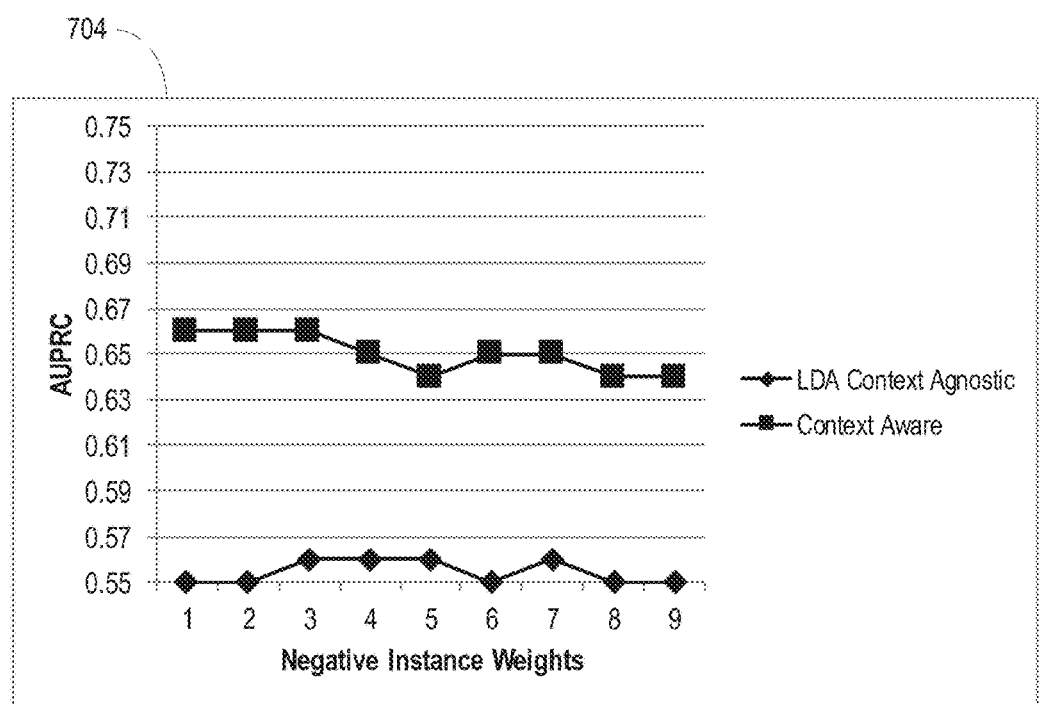
Figure 7C:
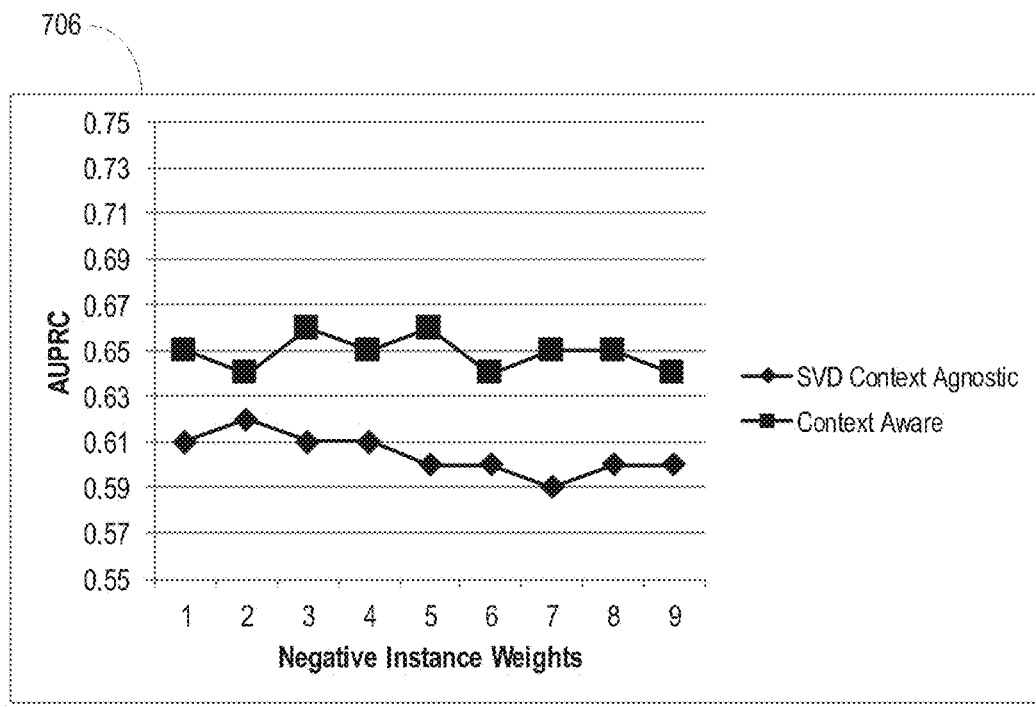
Figure 7D:
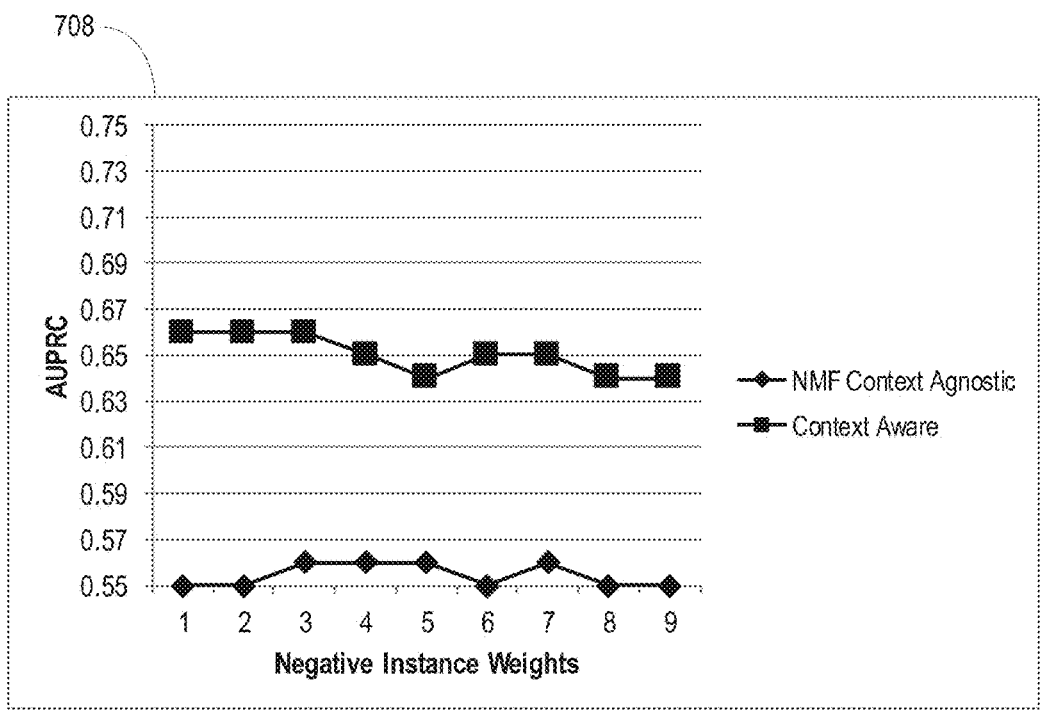

Furthermore, FIGS. 6A-6D and FIGS. 7A-7D illustrate that an improved performance is consistently obtained by including the context-aware feature $\sigma_5$. For example, on the News dataset, the native context maximally improves LDA and NMF by 6.1%. On the Blog dataset, the improvements are even more significant, where the native context improves LDA by 20% (FIG. 7B). Notably, the improvements are consistent regardless of the cost of false negatives, eliminating the time-consuming process of tuning the cost parameter in real world applications.

Figure 6A:
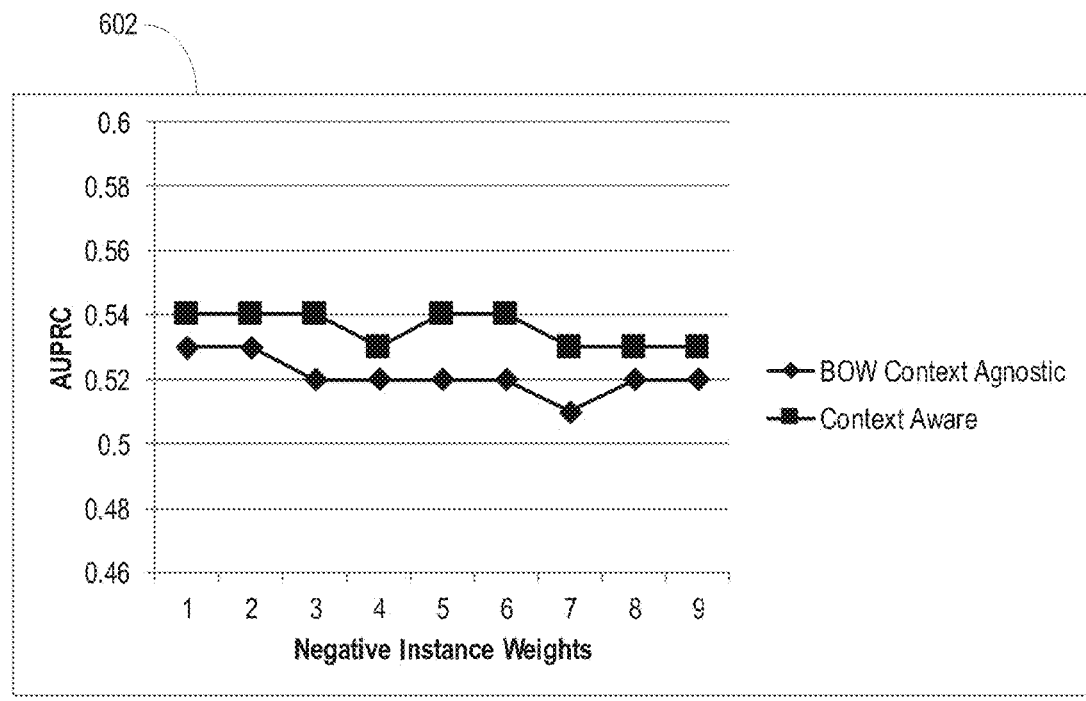
FIGS. 6A-6E are graphs illustrating the improvement in accuracy for various language models using a first native context-aware feature determined, in accordance with an example embodiment, for a first set of articles.
Figure 6B:
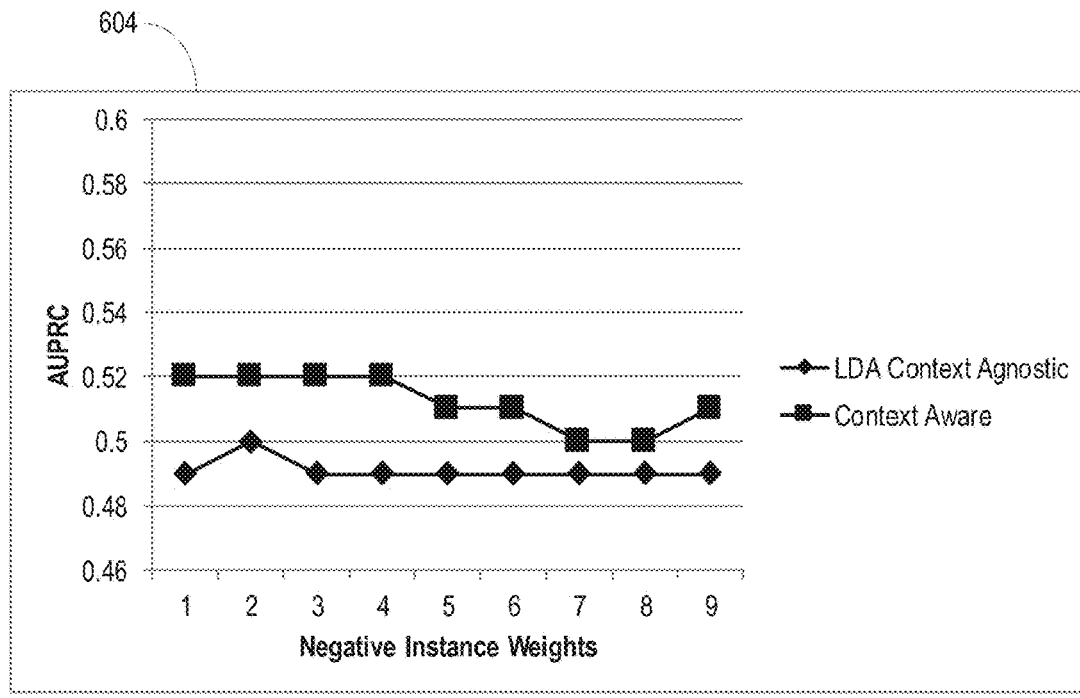
Figure 6C:
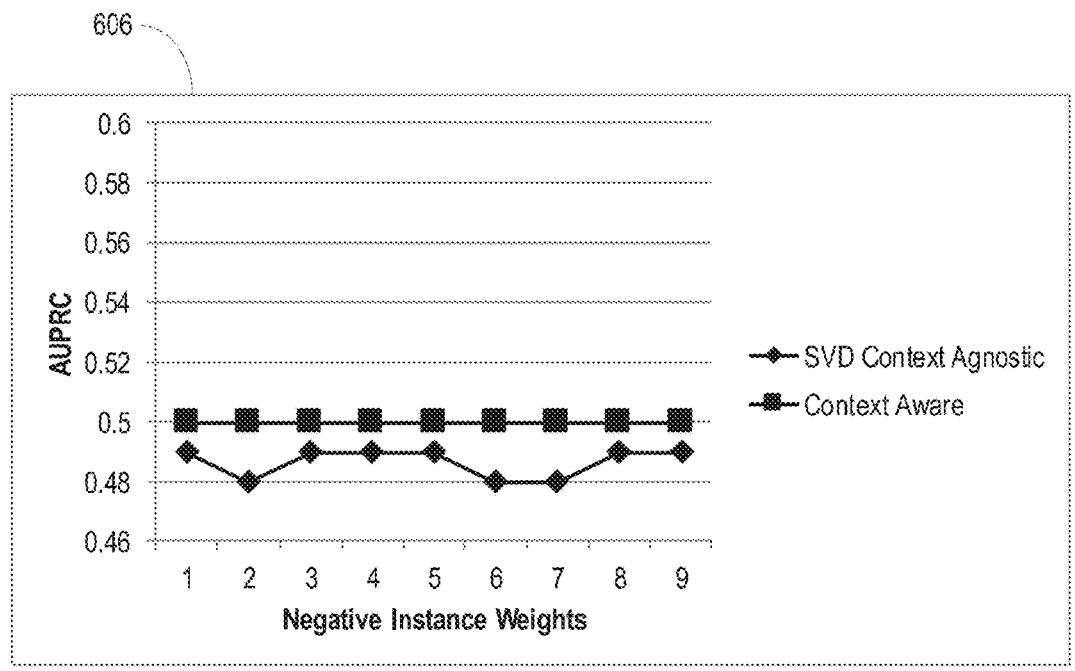
Figure 6D:
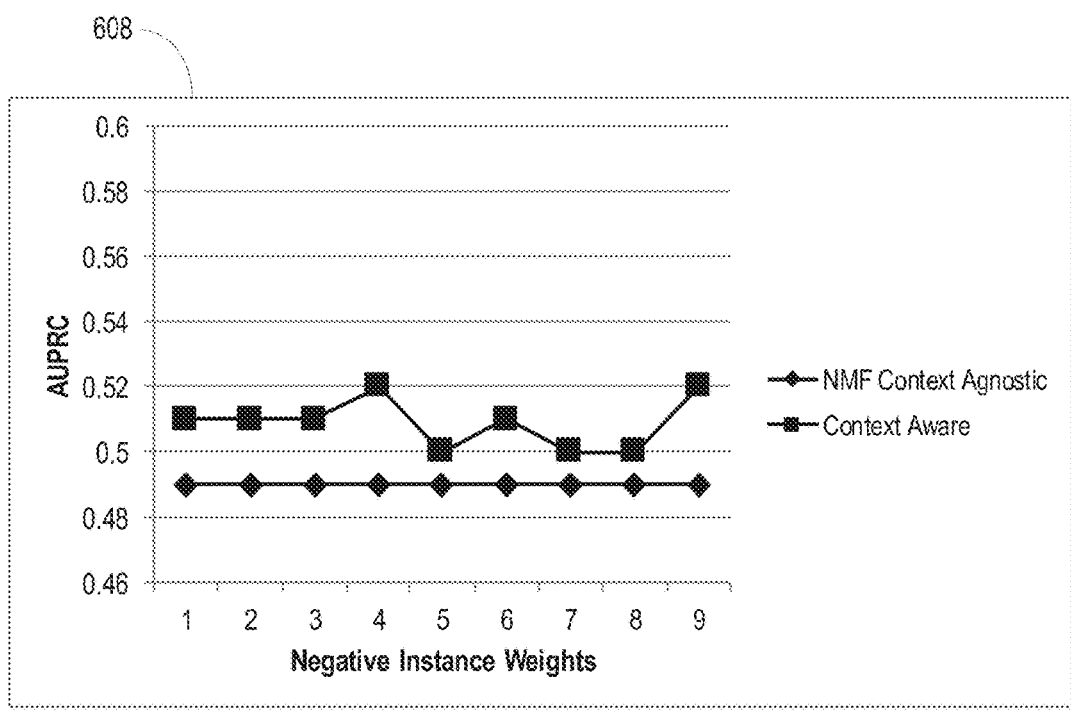
Figure 6E:
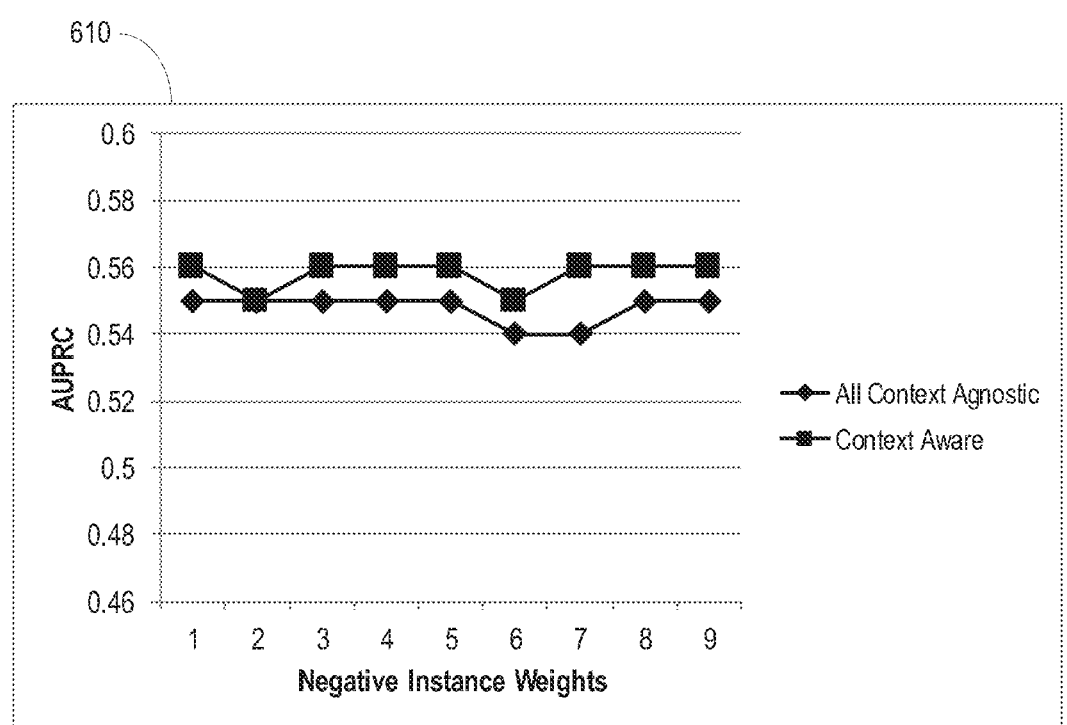
Figure 7E:
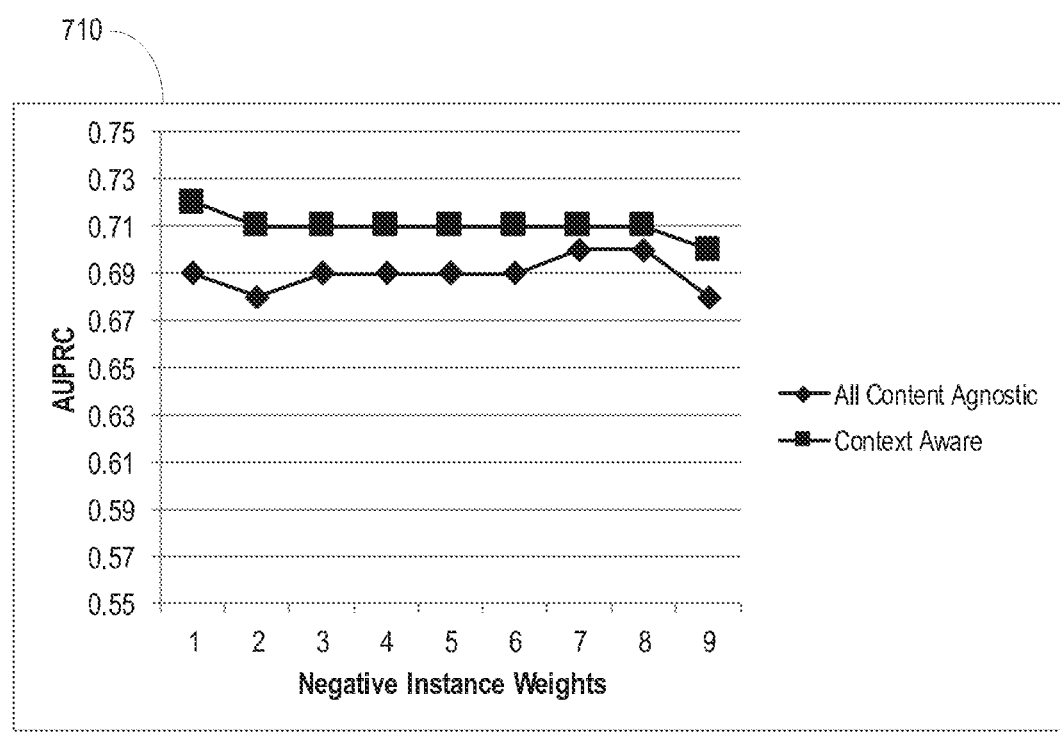

FIG. 6E and FIG. 7E illustrate the improvements due to native contexts on the combination of all context agnostic features. In particular, the improvements are 1.8% on the News dataset and 4.3% on the Blog dataset. In addition, using all four context-agnostic models gives the best performance on the News dataset, and the proposed native context brings the AUPRC even higher. This has implications in real world applications, where it may be important to locate certain points on the precision-recall-curve where precisions are high and recalls are low.

Figure 8A:
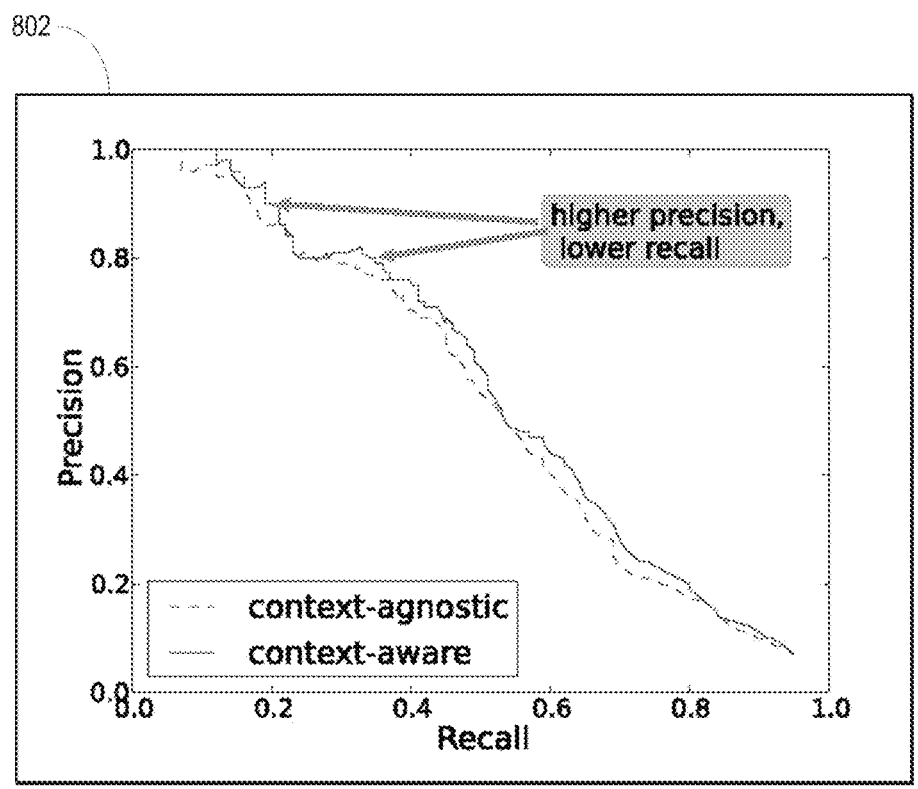
FIGS. 8A-8B are graphs illustrating the precision-recall curves, in accordance with example embodiments, based on a native context-aware feature.
Figure 8B:
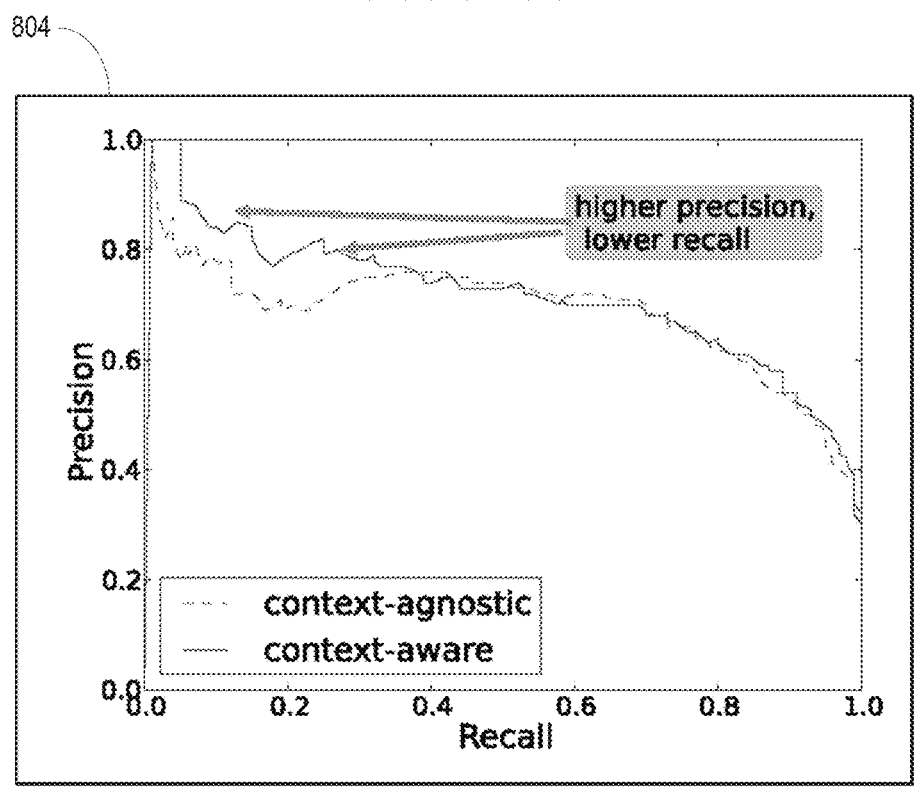

FIGS. 8A-8B are graphs 802,804 of precision-recall curves, in accordance with example embodiments, based on a native context-aware feature. In particular, graphs 802,804 illustrate precision recall curves for the Blog dataset (graph 802) and the News dataset (graph 804) with and without the context-aware feature $\sigma_5$. The areas where precisions are at least 80% are annotated using arrows. It is clear that native contexts consistently improve the performance over the combined context-agnostic models by achieving lower recalls in the critical regions.

Figure 9A:
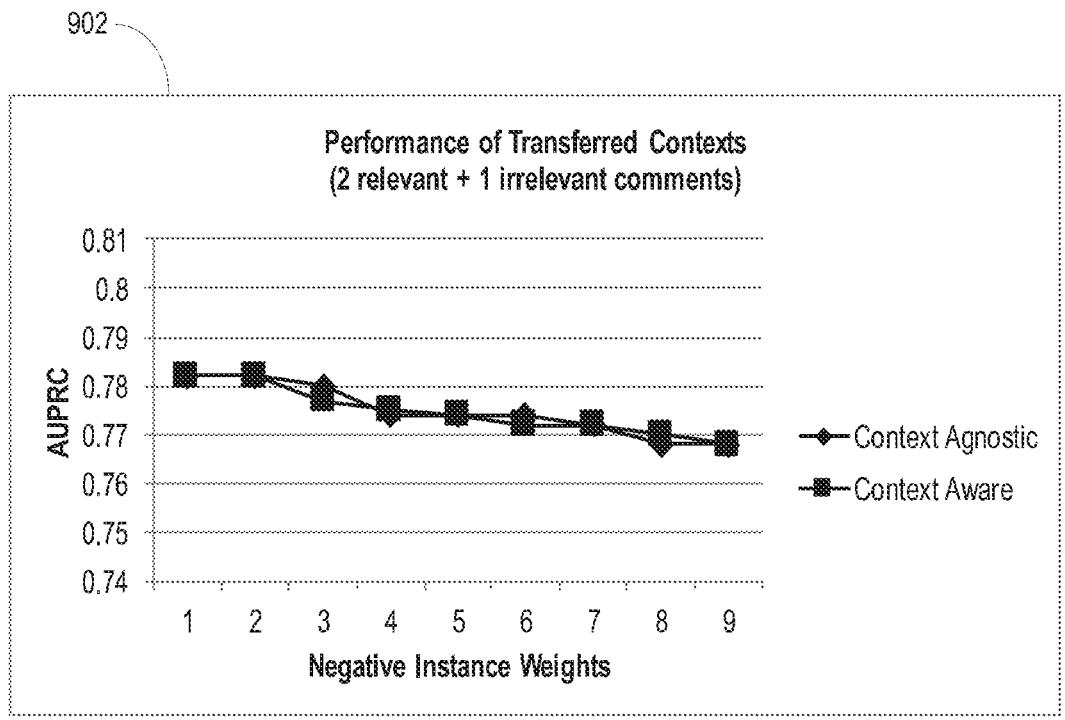
FIGS. 9A-9C are graphs illustrating the improvement in accuracy for a given topic model based on the number of comments and a determined transferred context-aware feature determined in accordance with an example embodiment.
Figure 9B:
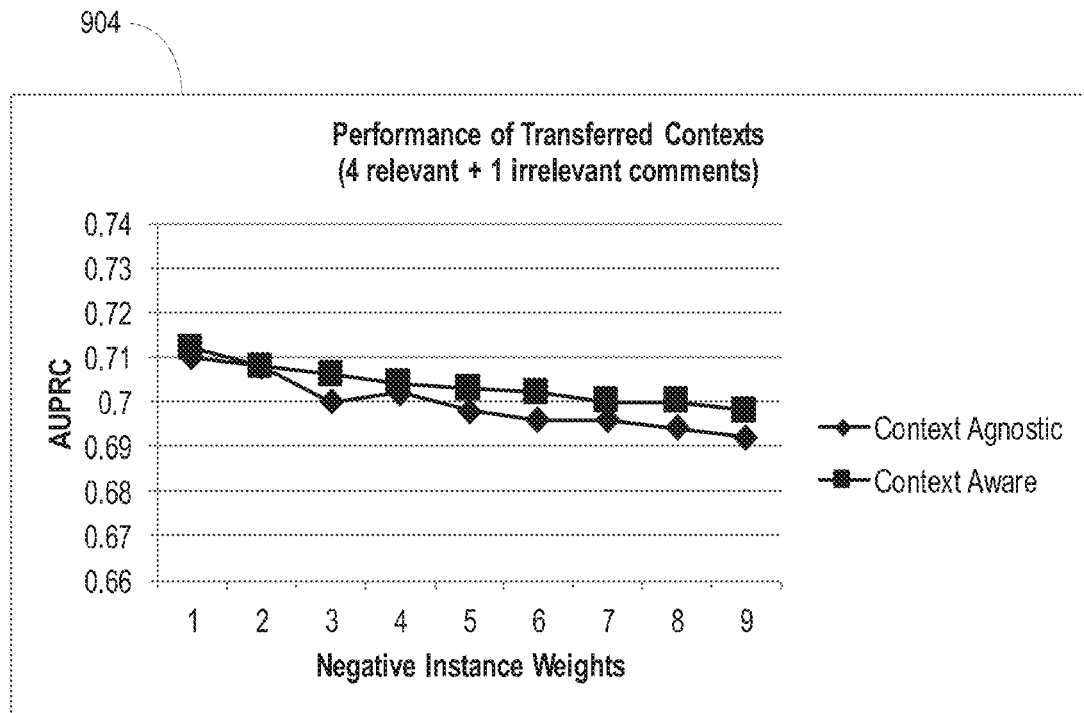
Figure 9C:
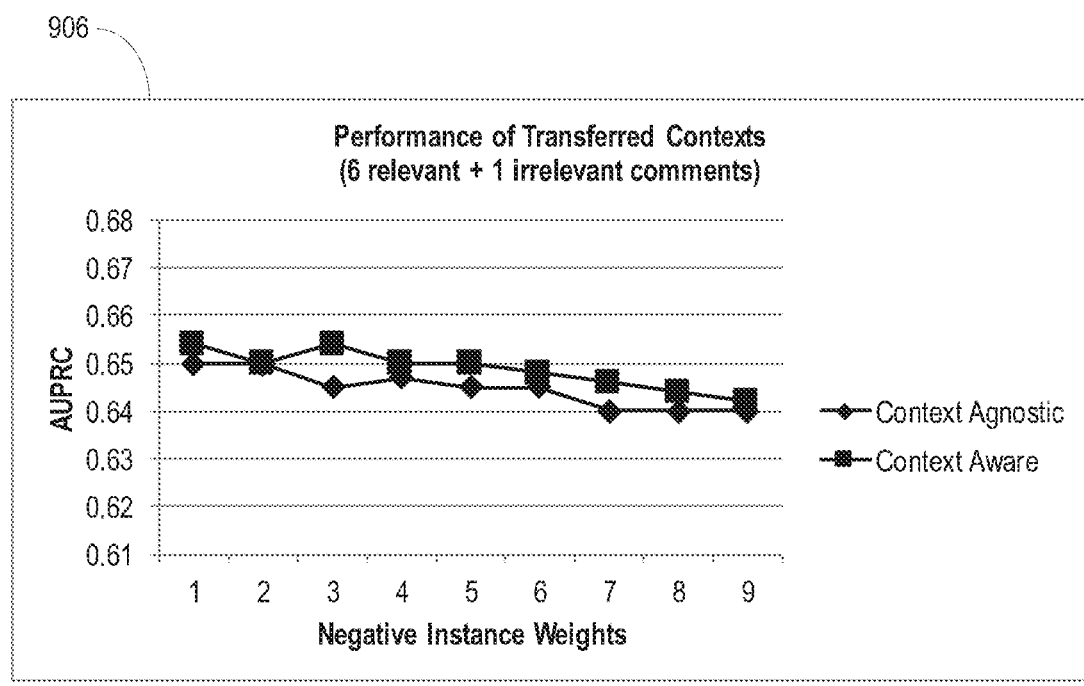

FIGS. 9A-9C are graphs 902-906 illustrating the improvement in accuracy for a given topic model based on the number of comments and a determined transferred context-aware feature (e.g., $\sigma_6$) determined in accordance with an example embodiment. For graphs 902-906, the News dataset was used to determine the effectiveness of the transferred context-aware feature.

For each irrelevant comment in the News dataset, a predetermined number (e.g., two, four, and six) of relevant comments were randomly sampled following the same article. The randomly sampled comments and the selected irrelevant comment were then treated as the only available comments for the article. Using the pseudo-code outlined above, transferred contexts were determined for each set of comments along with a transferred context feature $\sigma_6$. The transferred context feature $\sigma_6$ was then added to the combination of all context-agnostic signals (e.g., $\sigma_1, \ldots, \sigma_4$) as it was determined that the combined signals have the best performance on this dataset. The context-agnostic signals were generated as follows: SVD and NMF were used to decompose the term-document matrices derived from articles and the associated positive/sampled negative comments; LDA and BOW were applied as they were for determining the performance of the native context feature. Since there is a source of randomness due to sampling, this experiment was repeated 10 times for each parameter setting and the mean AUPRC was reported.

The mean of AUPRC of the methods with and without the transferred context feature $\sigma_6$ are compared in graphs 902-906 of FIGS. 9A-9C. Each of the graphs 902-906 were obtained using different numbers of sampled relevant comments. In FIG. 9A, it is apparent that the determined transferred context improves the AUPRC. However, it was determined that the detection of irrelevant comments may be difficult when there is only limited information available. In contrast, when additional sampled comments are added, it is evident that the transferred context feature $\sigma_6$ improves the AUPRC, as illustrated in FIG. 9B and FIG. 9C. This improvement may be because the quality of transferred contexts depends on the transferred top similar comments to the target comments. When there are a limited number of comments (e.g., three comments), the transferred contexts and the constructed contexts may not be very accurate. However, when there are additional target comments (e.g., five or seven comments), the constructed contexts have a better quality, as there is more information for transferring the most helpful comments.

Figure 10A:
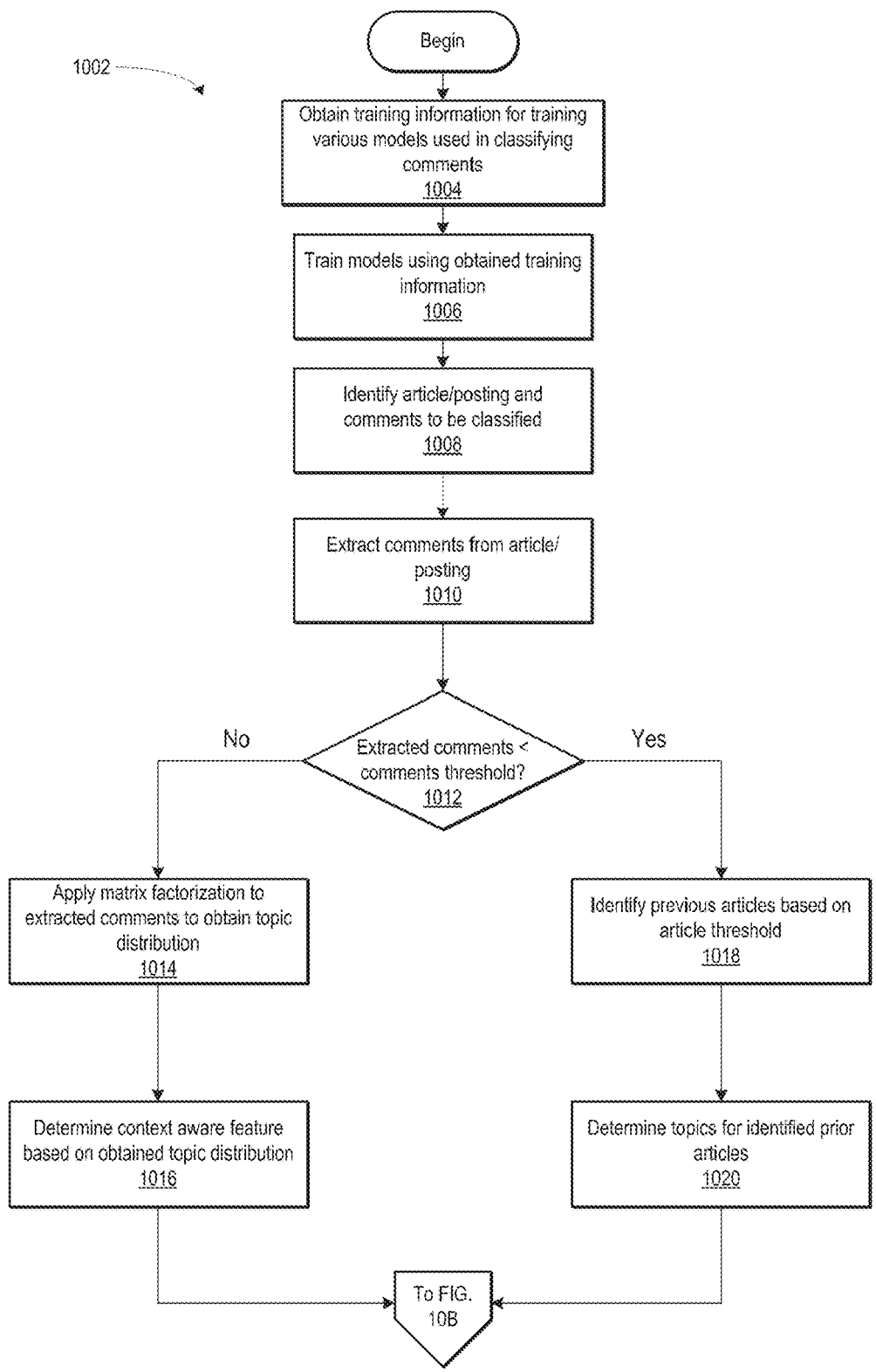
FIGS. 10A-10B illustrate a method, in accordance with an example embodiment, for determining whether a comment selected from a set of comments is irrelevant.
Figure 10B:
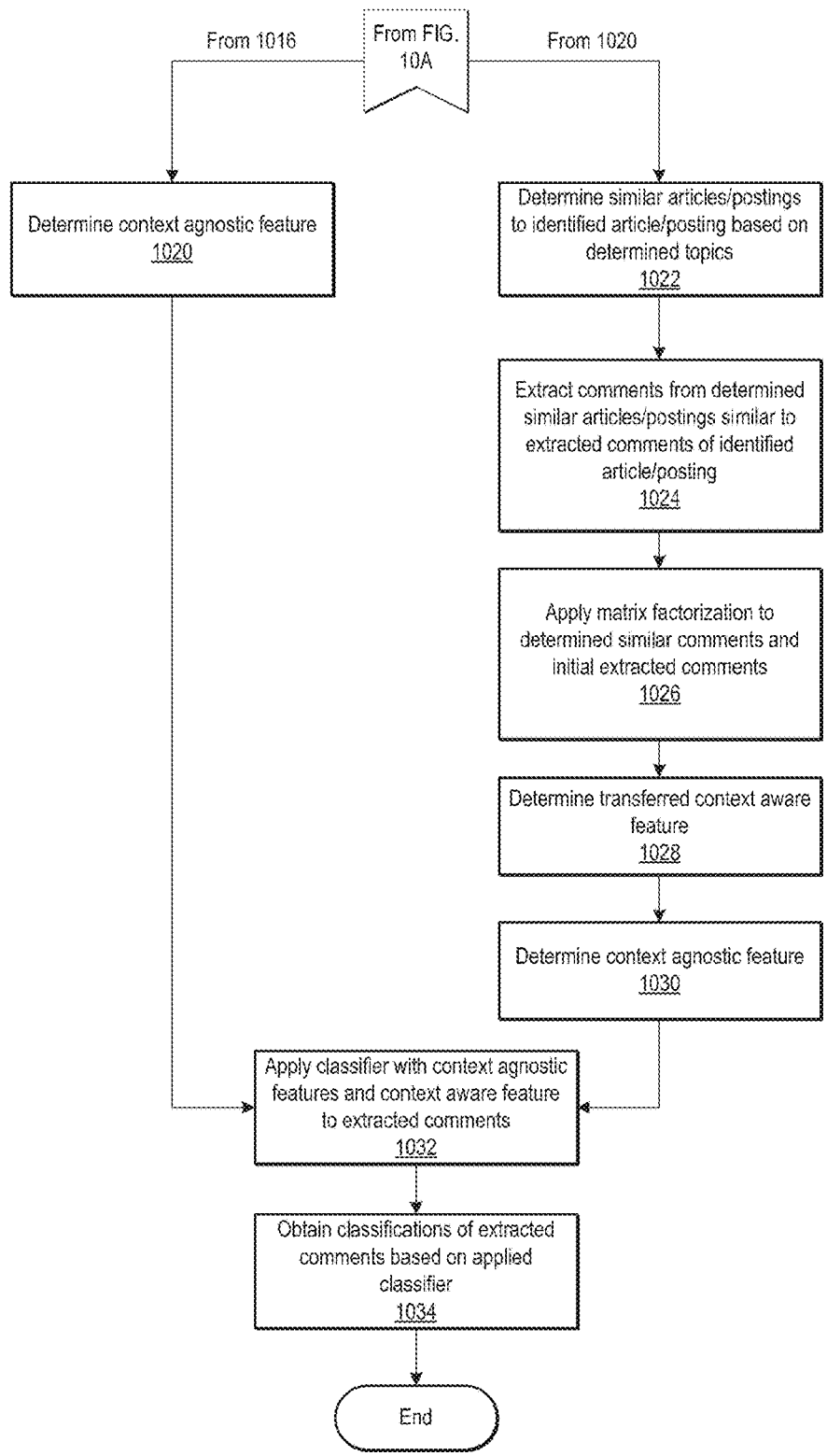

FIGS. 10A-10B illustrate a method 1002, in accordance with an example embodiment, for determining whether a comment selected from a set of comments is irrelevant. The method 1002 may be implemented on the social networking server 204 and, accordingly, is merely described by way of reference thereto. Initially, training data may be obtained for training various language models (Operation 1004). In one embodiment, the training data may include comments labeled as relevant and irrelevant along with their corresponding articles. The comments may be labeled by various entities and, in one embodiment, are labeled via a crowd-sourcing method.

One or more language models may then be trained with the obtained training data (Operation 1006). Examples of language models that may be trained include BOW, LDA, NMF, and SVD.

Following the training of the various language models, one or more articles may be identified and/or selected from an online content provider (Operation 1008). As discussed above, the selected article may be associated with corresponding comments, and the comments may be extracted from the article (Operation 1010). The social networking server 204 may then determine whether there are a sufficient number of extracted comments to construct a native context (Operation 1012). In one embodiment, a comment threshold is established with the social networking server 204, and the number of comments extracted from the article is compared with the comment threshold. As discussed above, a comment threshold may be implemented as it can be difficult to construct a native context for a given set of a comments when there are few neighboring comments (e.g., when the article is first made publicly available for commenting, and there are only 2-3 comments available).

Should there be a sufficient number of comments associated with a given article (e.g., there are enough comments to construct a native context), the social networking server 204 may then proceed to construct the native context. To construct the native context, the social networking server 204 may construct a term-article matrix for the extracted comments associated with the selected article, and then apply a matrix factorization (e.g., SVD, LSI, NMF, etc.) to the term-article matrix to obtain a topic distribution matrix for the extracted comments (Operation 1014). Thereafter, a context-aware feature (e.g., the native context-aware feature $\sigma_5$) may be obtained from the determined topic distribution matrix (Operation 1016). As discussed above, determining the native context-aware feature $\sigma_5$ may include invoking equation 8 with the determined topic distribution matrix. Referring to FIG. 10B, the operations continue to determining one or more context agnostic features (e.g., $\sigma_1, \sigma_2, \sigma_3, \sigma_4$) for each of the various language models (Operation 1020) to be used as input to a classifier for classifying comments as relevant or irrelevant.

Referring back to FIG. 10A, should there not be a sufficient number of extracted comments to determine a native context-aware feature (e.g., Operations 1014-1016), the social networking server 204 may proceed to determining a transferred context-aware feature (e.g., Operations 1018-1026) for the set of comments associated with the selected article. In one embodiment, the social networking server 204 identifies a number of previous articles that were published prior to the selected article (Operation 1018). The previous articles may be selected on the basis of an article threshold, which may be measured in any increment of time (e.g., minutes, hours, days, etc.) and/or measured from a date certain (e.g., the date when the given article was published). The social networking server 204 may also identify a predetermined number of articles made available prior to the selected article. For example, the social networking server 204 may identify 50 articles (or (or any other number) that were published at least two days (or any other increment of time) before the given article. Should the selected number of previous articles not be sufficient based on the given timeframe (e.g., less than a predetermined number of articles), the social networking server 204 may continue identifying previous articles (e.g., by increasing the timeframe by specified intervals) until a sufficient number of previously published articles have been identified.

The social networking server 204 may then determine topics for the selected previously published articles and the selected article (Operation 1020). In one embodiment, the topics for the selected previously published articles and the selected article is performed by executing a topic model, such as LDA, on the set of articles. In addition, the topic model may also be executed on the comments associated with the selected previously published articles and the selected article.

The social networking server 204 may then identify topics closest in similarity to the topics for the selected article (Operation 1022). In one embodiment, the social networking server 204 identifies a predetermined number of topics closest in similarity to the topics of the selected article (e.g., five topics, 10 topics, etc.). Similarity of topics may be decided by using such resources as an online thesaurus, through topic clustering, using natural language processing, probabilistic topic modeling, or through other such means or combinations of means. Having identified similar topics, the social networking server 204 may then select a set of previously published articles associated with the identified similar topics.

As with the previously published articles, the social networking server 204 may extract a set of comments associated with topics similar to the topics of the extracted comments of the selected article (Operation 1024). In one embodiment, the social networking server 204 selects a predetermined or threshold amount of comments (e.g., top 50% of the topically similar comments).

Having selected topically similar comments and articles, the social networking server 204 may construct a term-article matrix for the topically similar comments and articles. The social networking server 204 may then apply a matrix factorization (e.g., SVD) to the term-article matrix to obtain a matrix representing a topic distribution of the comments (Operation 1026). Using the determined matrix (e.g., $f_{svd}^C(q_k^d)=V_k^d$), the social networking server 204 may then determine the transferred context-aware feature $\sigma_6$ via equation 8, substituting $f_{svd}^C(q_k^d)$ for) $f_{svd}^N(q_k^d)$. The various context agnostic features (e.g., $\sigma_1$, $\sigma_2$, $\sigma_3$, $\sigma_4$) for each of the various language models may then be determined (Operation 1030) for use as input to a classifier for classifying comments associated with the selected article as relevant or irrelevant.

Having determined the native context-aware feature $\sigma_5$ and/or the transferred context-aware feature $\sigma_6$, the social networking server 204 may then provide the determined features, e.g., one or more combinations of the context-aware features and context-agnostic features, to a language classifier (e.g., an SVM classifier, a kNN classifier, a naïve Bayes classifier, or other such classifier) (Operation 1032). Results from the classifier may then be obtained indicating whether a given comment is irrelevant (Operation 1034).

Figure 11:
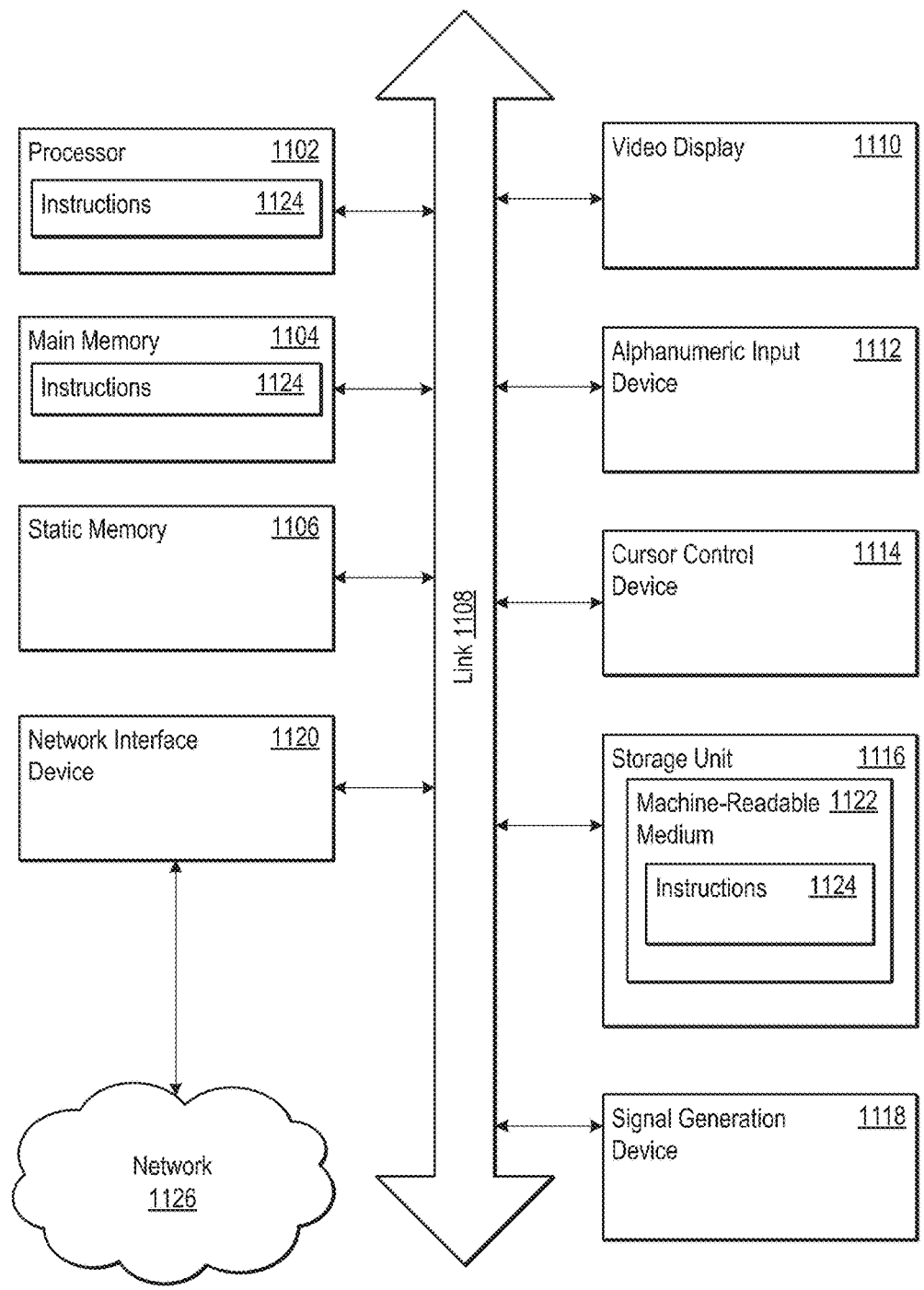
FIG. 11 is a block diagram illustrating components of a machine, in accordance with an example embodiment, configured to read instructions from a machine-readable medium.

FIG. 11 is a block diagram illustrating components of a machine 800, in accordance with an example embodiment, configured to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 1124 (e.g., software) for causing the machine 1100 to perform any one or more of the methodologies discussed herein may be executed. In alternative examples, the machine 1100 operates as a stand-alone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a video display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A method for detecting irrelevant texts, the method comprising:
    selecting a first article of interest from a plurality of articles, the first article being associated with a first plurality of comments previously provided from one or more entities having accessed the first article;
    extracting the first plurality of comments;
    in response to a determination that the first plurality of comments exceed a comment threshold that defines a minimum number of comments to use in determining a native context, determining the native context for the selected first article by:
        determining a term-comment matrix for the first plurality of comments, the term-comment matrix identifying a plurality of terms found in the first plurality of comments;
        applying a matrix factorization to the term-comment matrix to obtain a context-aware topic distribution of topics associated with the first plurality of comments;
        determining a context-aware feature for a comment selected from the extracted first plurality of comments based on the context-aware topic distribution and a similarity between the selected comment and the first article, wherein the similarity between the selected comment and the first article is determined based on the term-comment matrix for the first plurality of comments, the term-comment matrix identifying a plurality of terms found in the first plurality of comments, and a term-document matrix constructed from one or more comments associated with an article selected from the plurality of articles;
        applying a text classifier to the extracted one or more comments using the determined context-aware feature, the text classifier providing an indication of whether a given comment from the extracted plurality of comments is irrelevant; and
        in response to the applied text classifier, taking an action on the given comment based on the provided indication; and
    in response to a determination that the extracted one or more comments do not exceed the comment threshold, determining a transferred context for the selected first article by:
        extracting a second plurality of comments from a subset of articles selected from the plurality of articles, the extracted second plurality of comments being topically similar to the extracted first plurality of comments, wherein the subset of articles includes articles other than the first article;
        combining the extracted first plurality of comments and the extracted second plurality of comments to obtain a third plurality of comments;
        applying a matrix factorization to the third plurality of comments to determine context-dependent semantics of the first plurality of comments;
        determining a transferred context-aware feature for the first plurality of comments using the determined context-dependent semantics and the third plurality of comments;
        applying the text classifier to the extracted first plurality of comments using the determined transferred context-aware feature, the text classifier providing an indication whether a given comment from the extracted first plurality of comments is irrelevant; and
        in response to the applied text classifier, taking an action on the given comment based on the provided indication.

2. The method of claim 1, further comprising:
determining a transferred context-aware topic distribution of topics from the third plurality of comments, wherein the determining of the transferred context-aware feature is based on the determined transferred context-aware topic distribution.

3. The method of claim 1, wherein the matrix factorization applied to the term-comment matrix comprises a non-negative matrix factorization.

4. The method of claim 1, wherein the similarity between the selected comment and the first article is defined as $\cos(m_d, f_{SVD}^N(q_k^d))$, where:
    $f_{SVD}^N(\cdot)$ is a vector-to-vector transformation obtained by decomposing the term-comment matrix using single value decomposition matrix factorization;
    $q_k^d$ is a kth-comment selected from the extracted one or more comments of a dth-article selected from the plurality of articles; and
    $m_d$ is defined as $$\frac{\sum_{q \in Q^d} f_{SVD}^N(q)}{C_d},$$

where
- $Q^d$ is a term-document matrix constructed from the extracted one or more comments for the dth-article selected from the plurality of articles;
- q is a comment selected from the extracted one or more comments; and
- $C_d$ is the number of extracted one or more comments associated with the first article.

5. The method of claim 1, wherein the action taken comprises:
   identifying the given comment as an irrelevant comment based on the indication exceeding a previously established threshold; and
   removing the association of the given comment with the first article.

6. The method of claim 1, wherein the action taken comprises:
   identifying the given comment as an irrelevant comment based on the indication exceeding a first previously established threshold; and
   identifying the given comment for moderation by a reviewer based on the indication not exceeding a second previously established threshold.

7. A system for detecting irrelevant texts, the system comprising:
   a non-transitory, computer-readable medium having computer-executable instructions stored thereon; and
   one or more processors in communication with the non-transitory, computer-readable medium that, having executed the computer-executable instructions, are configured to:
      select a first article of interest from a plurality of articles, the first article being associated with a first plurality of comments previously provided from one or more entities having accessed the first article;
      extract the first plurality of comments;
      in response to a determination that the first plurality of comments exceed a comment threshold that defines a minimum number of comments to use in determining a native context, determining the native context for the selected first article by:
         determining a term-comment matrix for the first plurality of comments, the term-comment matrix identifying a plurality of terms found in the first plurality of comments;
         applying a matrix factorization to the term-comment matrix to obtain a context-aware topic distribution of topics associated with the first plurality of comments;
         determining a context-aware feature for a comment selected from the extracted first plurality of comments based on the context-aware topic distribution and a similarity between the selected comment and the first article;
      applying a text classifier to the extracted one or more comments using the determined context-aware feature, the text classifier providing an indication of whether a given comment from the extracted plurality of comments is irrelevant; and
      in response to the applied text classifier, taking an action on the given comment based on the provided indication; and
      in response to a determination that the extracted one or more comments do not exceed the comment threshold, determine a transferred context for the selected first article by:
         extracting a second plurality of comments from a subset of articles selected from the plurality of articles, the extracted second plurality of comments being topically similar to the extracted first plurality of comments, wherein the subset of articles includes articles other than the first article;
         combining the extracted first plurality of comments and the extracted second plurality of comments;
         applying a matrix factorization to the third plurality of comments to determine context-dependent semantics of the first plurality of comments;
         determining a transferred context-aware feature for the first plurality of comments using the determined context-dependent semantics and the third plurality of comments;
         applying the text classifier to the extracted first plurality of comments using the determined transferred context-aware feature, the text classifier providing an indication whether a given comment from the extracted first plurality of comments is irrelevant; and
         in response to the applied text classifier, taking an action on the given comment based on the provided indication.

8. The system of claim 7, wherein the one or more processors are further configured to:
   determine a transferred context-aware topic distribution of topics associated with the third plurality of comments, wherein the determining of the transferred context-aware feature is based on the determined transferred context-aware topic distribution.

9. The system of claim 7, wherein the matrix factorization applied to the term-comment matrix comprises a non-negative matrix factorization.

10. The system of claim 7, wherein the similarity between the selected comment and the first article is defined as $\cos(m_d, f_{SVD}^N(q_k^d))$, where:
   - $f_{SVD}^N(\cdot)$ is a vector-to-vector transformation obtained by decomposing the term-comment matrix using single value decomposition matrix factorization;
   - $q_k^d$ is a kth-comment selected from the extracted one or more comments of a dth-article selected from the plurality of articles; and
   - $m_d$ is defined as $$\frac{\sum_{q \in Q^d} f_{SVD}^N(q)}{C_d},$$

where
- $Q^d$ is a term-document matrix constructed from the extracted one or more comments for the dth-article selected from the plurality of articles;
- q is a comment selected from the extracted one or more comments; and
- $C_d$ is the number of extracted one or more comments associated with the first article.

11. The system of claim 7, wherein the action taken by the one or more processors comprises:
   identifying the given comment as an irrelevant comment based on the indication exceeding a previously established threshold; and
   removing the association of the given comment with the first article.

12. The system of claim 7, wherein the action taken by the one or more processors comprises:
  identifying the given comment as an irrelevant comment based on the indication exceeding a first previously established threshold; and
  identifying the given comment for moderation by a reviewer based on the indication not exceeding a second previously established threshold.

13. A non-transitory, computer-readable medium having computer-executable instructions stored thereon that, when executed by one or more processors, cause the one or more processors to perform a method, the method comprising:
  selecting a first article of interest from a plurality of articles, the article being associated with a first plurality of comments previously provided from one or more entities having accessed the article;
  extracting the first plurality of comments;
  in response to a determination that the first plurality of comments exceed a comment threshold that defines a minimum number of comments to use in determining a native context, determining the native context for the selected first article by:
    determining a term-comment matrix for the first plurality of comments, the term-comment matrix identifying a plurality of terms found in the first plurality of comments;
    applying a matrix factorization to the term-comment matrix to obtain the context-aware topic distribution of topics associated with the first plurality of comments;
    determining a context-aware feature for a comment selected from the extracted first plurality of comments based on the context-aware topic distribution and a similarity between the selected comment and the first article;
    applying a text classifier to the extracted one or more comments using the determined context-aware feature, the text classifier providing an indication of whether a given comment from the extracted plurality of comments is irrelevant; and
    in response to the applied text classifier, taking an action on the given comment based on the provided indication; and
  in response to a determination that the extracted one or more comments do not exceed the comment threshold, determining a transferred context for the selected first article by:
    extracting a second plurality of comments from a subset of articles selected from the plurality of articles, the extracted second plurality of comments being topically similar to the extracted first plurality of comments, wherein the subset of articles includes articles other than the first article;
    combining the extracted first plurality of comments and the extracted second plurality of comments to obtain a third plurality of comments;
    applying a matrix factorization to the third plurality of comments to determine context-dependent semantics of the first plurality of comments;
    determining a transferred context-aware feature for the first plurality of comments using the determined context-dependent semantics and the third plurality of comments;
    applying the text classifier to the extracted first plurality of comments using the determined transferred context-aware feature, the text classifier providing an indication whether a given comment from the extracted first plurality of comments is irrelevant; and
    in response to the applied text classifier, taking an action on the given comment based on the provided indication.

14. The non-transitory, computer-readable medium of claim 13, wherein the method further comprises:
  determining a transferred context-aware topic distribution of topics from the third plurality of comments, wherein the determining of the transferred context-aware feature is based on the determined transferred context-aware topic distribution.

15. The non-transitory, computer-readable medium of claim 13, wherein the similarity between the selected comment and the first article is defined as $\cos(m_d, f_{SVD}^N(q_k^d))$ where:
  $f_{SVD}^N(\cdot)$ is a vector-to-vector transformation obtained by decomposing the term-comment matrix using single value decomposition matrix factorization;
  $q_k^d$ is a kth-comment selected from the extracted one or more comments of a dth-article selected from the plurality of articles; and
  $m_d$ is defined as $$\frac{\sum_{q \in Q^d} f_{SVD}^N(q)}{C_d},$$

where
  $Q^d$ is a term-document matrix constructed from the extracted one or more comments for the dth-article selected from the plurality of articles;
  q is a comment selected from the extracted one or more comments; and
  $C_d$ is the number of extracted one or more comments associated with the first article.

16. The non-transitory, computer-readable medium of claim 13, wherein the action taken comprises:
  identifying the given comment as an irrelevant comment based on the indication exceeding a previously established threshold; and
  removing the association of the given comment with the first article.

17. The non-transitory, computer-readable medium of claim 13, wherein the action taken comprises:
  identifying the give comment as an irrelevant comment based on the indication exceeding a first previously established threshold; and
  identifying the given comment for moderation by a reviewer based on the indication not exceeding a second previously established threshold.

* * * * *

UNITED STATES PATENT AND TRADEMARK OFFICE
CERTIFICATE OF CORRECTION

PATENT NO. : 10,037,320 B2
APPLICATION NO. : 14/587650
DATED : July 31, 2018
INVENTOR(S) : Amin et al.

It is certified that error appears in the above-identified patent and that said Letters Patent is hereby corrected as shown below:

On the Title Page

On page 2, in Column 1, item (56), under "Other Publications", Line 20, delete "Computions"," and insert --Computations",-- therefor On page 2, in Column 2, item (56), under "Other Publications", Line 40, delete "Inter-Comnent" and insert --Inter-Comment-- therefor In the Claims In Column 28, Line 22, in Claim 15, after "$\cos(m_d, f_{SVD}^N(q_k^d))$", insert --,--

In Column 28, Line 54, in Claim 17, delete "give" and insert --given-- therefor

Signed and Sealed this
Ninth Day of July, 2019

Andrei Iancu
*Director of the United States Patent and Trademark Office*